United States Patent
Gohshi

(10) Patent No.: US 8,891,898 B2
(45) Date of Patent: Nov. 18, 2014

(54) SIGNAL PROCESSING DEVICE AND CONTROL PROGRAM FOR SHARPENING IMAGES

(75) Inventor: Seiichi Gohshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 236 days.

(21) Appl. No.: 13/577,953

(22) PCT Filed: Nov. 8, 2010

(86) PCT No.: PCT/JP2010/069841
§ 371 (c)(1),
(2), (4) Date: Aug. 9, 2012

(87) PCT Pub. No.: WO2011/099202
PCT Pub. Date: Aug. 18, 2011

(65) Prior Publication Data
US 2012/0314968 A1  Dec. 13, 2012

(30) Foreign Application Priority Data
Feb. 15, 2010 (JP) .................... 2010-030571

(51) Int. Cl.
G06K 9/40 (2006.01)
H04N 5/208 (2006.01)
G06T 5/00 (2006.01)
H04N 5/14 (2006.01)

(52) U.S. Cl.
CPC ............. H04N 5/208 (2013.01); *G06T 5/003* (2013.01); *H04N 5/142* (2013.01); *G06T 2207/20201* (2013.01)
USPC ...................................... 382/263

(58) Field of Classification Search
None
See application file for complete search history.

(56) References Cited

U.S. PATENT DOCUMENTS 5,063,445 A * 11/1991 Nishizawa et al. ...... 375/240.25
5,321,511 A   6/1994 Min
(Continued)

FOREIGN PATENT DOCUMENTS

EP  2 026 560 A2  2/2009
EP  2 124 430 A1  11/2009
(Continued)

OTHER PUBLICATIONS

Gohshi, "Decoding Device, Control Method for a Decoding Device, Transmission System, and Computer-Readable Recording Medium Having a Control Program Recorded Thereon ," U.S. Appl. No. 13/504,351, filed Apr. 26, 2012.
(Continued)

*Primary Examiner* — Bhavesh Mehta
*Assistant Examiner* — Feng Niu
(74) *Attorney, Agent, or Firm* — Keating & Bennett, LLP

(57) ABSTRACT

A signal processing device subjects a signal indicating a moving image constituted by frames to a sharpening process for the moving image, to output a signal indicating the sharpened moving image, and includes: a motion detection section for detecting motion between the frames for each block region including one or a plurality of adjacent pixels constituting each frame; a sharpening process section for subjecting a signal indicating an image of a block region from which motion has been detected to a nonlinear process by a nonlinear process section and sharpening the signal to generate a harmonic; and a signal output section for outputting, for the block region from which motion was detected, the harmonic produced by sharpening a signal indicating a moving image of the block region, while outputting, for a block region from which motion was not detected, a signal indicating a moving image of the block region.

15 Claims, 18 Drawing Sheets

(56) References Cited

U.S. PATENT DOCUMENTS

| | | | |
|---|---|---|---|
| 6,658,379 | B1 | 12/2003 | Ogata |
| 7,633,354 | B2 | 12/2009 | Kuijk et al. |
| 2002/0181583 | A1 | 12/2002 | Corbera |
| 2003/0151684 | A1 | 8/2003 | Shimazaki et al. |
| 2003/0218776 | A1 | 11/2003 | Morimoto et al. |
| 2004/0252907 | A1 | 12/2004 | Ito |
| 2005/0091051 | A1* | 4/2005 | Moriya et al. ............... 704/229 |
| 2005/0123214 | A1 | 6/2005 | Takahira |
| 2006/0239361 | A1 | 10/2006 | Iguchi et al. |
| 2007/0019114 | A1 | 1/2007 | de Garrido et al. |
| 2007/0140387 | A1 | 6/2007 | Wong et al. |
| 2007/0147478 | A1 | 6/2007 | Lai et al. |
| 2007/0269137 | A1 | 11/2007 | Ida et al. |
| 2009/0060373 | A1* | 3/2009 | Perera et al. ................. 382/264 |
| 2010/0214433 | A1* | 8/2010 | Takahashi ................. 348/223.1 |
| 2011/0279730 | A1 | 11/2011 | Goshi |
| 2012/0070098 | A1 | 3/2012 | Gohshi |
| 2012/0081198 | A1 | 4/2012 | Gohshi |

FOREIGN PATENT DOCUMENTS

| | | | |
|---|---|---|---|
| JP | 07-184085 A | | 7/1995 |
| JP | 07-312704 A | | 11/1995 |
| JP | 08-139969 A | | 5/1996 |
| JP | 09-233489 A | | 9/1997 |
| JP | 09233489 A | * | 9/1997 ............... H04N 9/64 |
| JP | 09-307897 A | | 11/1997 |
| JP | 09-319869 A | | 12/1997 |
| JP | 11-066311 A | | 3/1999 |
| JP | 11-340878 A | | 12/1999 |
| JP | 11-345331 A | | 12/1999 |
| JP | 2001-169116 A | | 6/2001 |
| JP | 2002-125200 A | | 4/2002 |
| JP | 2002-335527 A | | 11/2002 |
| JP | 2003-069859 A | | 3/2003 |
| JP | 2003-101774 A | | 4/2003 |
| JP | 2003-134352 A | | 5/2003 |
| JP | 2003-198878 A | | 7/2003 |
| JP | 2003-283835 A | | 10/2003 |
| JP | 2005-117549 A | | 4/2005 |
| JP | 2005-191895 A | | 7/2005 |
| JP | 2006-157584 A | | 6/2006 |
| JP | 2006-304352 A | | 11/2006 |
| JP | 2006-310934 A | | 11/2006 |
| JP | 2007-174637 A | | 7/2007 |
| JP | 2007-265122 A | | 10/2007 |
| JP | 2007-310837 A | | 11/2007 |
| JP | 2008-103785 A | | 5/2008 |
| JP | 2009-198935 A | | 9/2009 |
| WO | 98/35449 A1 | | 8/1998 |
| WO | 00/42778 A1 | | 7/2000 |
| WO | 02/084997 A1 | | 10/2002 |
| WO | 2007/078829 A1 | | 7/2007 |
| WO | 2010/113342 A1 | | 10/2010 |
| WO | 2010/140281 A1 | | 12/2010 |
| WO | 2010/146728 A1 | | 12/2010 |
| WO | 2011/061957 A1 | | 5/2011 |
| WO | 2011/061958 A1 | | 5/2011 |

OTHER PUBLICATIONS

Official Communication issued in International Patent Application No. PCT/JP2011/071706, mailed on Dec. 20, 2011.

Official Communication issued in International Patent Application No. PCT/JP2010/000372, mailed on Apr. 6, 2010.

Official Communication issued in International Patent Application No. PCT/JP2010/000299, mailed on Mar. 9, 2010.

Matsumoto et al., "A Study on One Frame Reconstruction-based Super-resolution Using Image Segmentation," The Institute of Electronics, Information and Communication Engineers, vol. 108(4), IE2008-6, Apr. 2008, pp. 31-36.

Vese et al., "Modeling Textures with Total Variation Minimization and Oscillating Patterns in Image Processing," Journal of Scientfic Computing, vol. 19, Nos. 1-3 Dec. 2003, 23 pages.

Aoki et al., "Wavelet Transform Coding by Zero Value Tree Structure and Vector Quantization," Picture Coding Symposium of Japan, Proceedings of the 16th Symposium, Nov. 14, 2001, pp. 95-96.

Gohshi et al., "Signal Processing Device, Control Program, and Integrated Circuit," U.S. Appl. No. 13/823,299, filed Mar. 14, 2013.

Official Communication issued in International Patent Application No. PCT/JP2010/069841, mailed on Dec. 7, 2010.

Gohshi et al., "A Novel Super Resolution Method with Non-Linear Function", Forum on Information Technology, Sep. 2-4, 2009, 11 pages.

Gohshi, "A New Signal Processing Method for Video-Reproduce the Frequency Spectrum Exceeding the Nyquist Frequency-", Multimedia System Conference, Feb. 22, 2012, 6 pages.

Gohshi, "Encoding Device, Decoding Device, Control Method for an Encoding Device, Control Method for a Decoding Device, Transmission System, and Computer-Readable Recording Medium Having a Control Program Recorded Thereon," U.S. Appl. No. 13/504,796, filed Apr. 27, 2012.

Gohshi, "Signal Processing Device, Control Method for Signal Processing Device, Control Program, and Computer-Readable Storage Medium Having the Control Program Recorded Therein," U.S. Appl. No. 13/375,251, filed Nov. 30, 2011.

Gohshi, "Waveform Shaping Device, Equalizer, Receiving System, Method of Controlling Waveform Shaping Device, Control Program, and Computer-Readable Medium in Which Control Program is Recorded," U.S. Appl. No. 13/377,907, filed Dec. 13, 2011.

Goshi, "Image Enhancing Device, Image Enhancing Method, Image Enhancing Program and Signal Processing Device," U.S. Appl. No. 13/138,197, filed Jul. 19, 2011.

* cited by examiner

SIGNAL PROCESSING DEVICE AND CONTROL PROGRAM FOR SHARPENING IMAGES

TECHNICAL FIELD

The present invention relates to a signal processing device etc. that improves image quality by sharpening an image.

BACKGROUND ART

Conventional image processing devices etc. carry out a process for sharpening an image (hereinafter referred to as sharpening process) in order to improve image quality of the image. For example, conventional television receivers carry out contour compensation for steepening rising and falling of an image signal corresponding to a contour portion of an image to be displayed by the television receivers. The contour compensation is carried out in such a manner that a high frequency component of an image signal (luminance signal) inputted to a display of a television receiver is extracted and the extracted high frequency component is amplified and added to the input image signal. This improves frequency characteristics of an image signal that is likely to be deteriorated while processed in individual circuits of the television receiver, thereby improving apparent image quality.

In a case of a moving image, moving image blur is likely to appear in a motion region, so that in general, the motion region seems blurred compared with a still region. In order to deal with this problem, conventionally, there has been carried out a sharpening process (so-called unsharp masking) with respect to a motion region of a moving image.

An example of a technique for improving moving image blur in a motion region of a moving image is the technique disclosed in Patent Literature 1. The technique disclosed in Patent Literature 1 is a technique for generating a PWM pulse (driving voltage waveform) that controls lightening of a backlight for a motion region.

CITATION LIST

Patent Literature

[Patent Literature 1]
Japanese Patent Application Publication No. 2009-198935 (published on Sep. 3, 2009)

SUMMARY OF INVENTION

Technical Problem

However, normally, the sharpening process in the conventional technique is a process for carrying out linear operation with respect to an image signal to be processed. Consequently, the sharpening process in the conventional technique cannot use a frequency component higher than Nyquist frequency (high frequency component which is not included in an image signal to be processed), and therefore cannot sufficiently improve image quality.

Furthermore, the technique disclosed in Patent Literature 1 merely apparently reduces blur of a motion region by controlling lightening of a backlight, and therefore is not a technique for sharpening an image signal.

The present invention was made in view of the foregoing problems. An object of the present invention is to provide a signal processing device, a control program, and an integrated circuit, each of which allows, with a simple configuration, highly sharpening a moving image.

Solution to Problem

In order to solve the foregoing problems, a signal processing device of the present invention is a signal processing device that subjects a signal indicative of a moving image constituted by a plurality of temporarily consecutive frames to a sharpening process for the moving image, to output a signal indicative of a moving image thus sharpened, the signal processing device including: motion detection means for detecting motion between the frames with respect to each block region consisting of one or a plurality of adjacent pixels constituting each of the frames; first high-frequency component generation means for generating a harmonic having been produced by sharpening a signal indicative of a moving image of the block region from which the motion has been detected by the motion detection means; and signal output means for outputting, with respect to the block region from which the motion has been detected by the motion detection means, the harmonic having been produced by sharpening a motion region signal that is a signal indicative of a moving image of the block region, while outputting, with respect to the block region from which the motion has not been detected by the motion detection means, a non-motion region signal that is a signal indicative of a moving image of the block region, the first high-frequency component generation means including: first low-frequency component removing means for removing, from frequency components of the motion region signal, at least a direct current component, to generate and output a first low-frequency-free signal; first nonlinear process means for receiving the first low-frequency-free signal, generating a first nonlinear process signal (i) in which positive and negative signs of the first low-frequency-free signal are retained and (ii) which broadly monotonically increases nonlinearly with respect to the first low-frequency-free signal when values of the first low-frequency-free signal are at least in the vicinity of 0, and outputting the first nonlinear process signal; and addition means for adding the first nonlinear process signal to the motion region signal, to generate the harmonic.

An integrated circuit of the present invention is an integrated circuit that subjects a signal indicative of a moving image constituted by a plurality of temporarily consecutive frames to a sharpening process for the moving image, to output a signal indicative of a moving image thus sharpened, the integrated circuit including: a motion detection circuit that detects motion between the frames with respect to each block region consisting of one or a plurality of adjacent pixels constituting each of the frames; a high-frequency component generation circuit that generates a harmonic having been produced by sharpening a signal indicative of a moving image of the block region from which the motion has been detected by the motion detection circuit; a signal output circuit that outputs, with respect to the block region from which the motion has been detected by the motion detection circuit, the harmonic having been produced by sharpening a motion region signal that is a signal indicative of a moving image of the block region, while outputting, with respect to the block region from which the motion has not been detected by the motion detection circuit, a non-motion region signal that is a signal indicative of a moving image of the block region, the high-frequency component generation circuit including: a low-frequency component removing circuit that removes, from frequency components of the motion region signal, at least a direct current component, to generate a low-frequency-free signal; a nonlinear process circuit that receives the low-frequency-free signal, generates a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0, and outputs the nonlinear process signal; and an addition circuit that adds the nonlinear process signal to the motion region signal, to generate the harmonic.

With the arrangement of the signal processing device, motion between frames is detected with respect to each block region, a harmonic is generated by sharpening a signal indicative of a moving image of a block region from which motion has been detected (hereinafter motion region) and the harmonic is outputted with respect to the motion region, whereas a non-motion region signal that is a signal indicative of a moving image of a block region from which motion has not been detected (hereinafter still region) is outputted with respect to the still region. When generating the harmonic, initially, a first low-frequency-free signal is generated by removing at least a direct current component from frequency components of a motion region signal indicative of a moving image of the motion region. Then, a first nonlinear process signal (i) in which positive and negative signs of the first low-frequency-free signal are retained and (ii) which broadly monotonically increases nonlinearly with respect to the first low-frequency-free signal when values of the first low-frequency-free signal are at least in the vicinity of 0 is generated. Then, the harmonic is generated by adding the first low-frequency-free signal to the motion region signal.

Consequently, it is possible to output a signal obtained by carrying out a nonlinear process with respect to the motion region signal indicative of an image of the motion region of a moving image.

The harmonic is generated by adding, to the motion region signal, the first nonlinear process signal having been produced by a nonlinear process such as squaring the first low-frequency-free signal. The generated signal retains positive and negative signs of the first low-frequency-free signal.

Consequently, the harmonic includes a high band frequency component which is not included in frequency components of a signal indicative of an image of a motion region. As a result, the harmonic includes a frequency component higher than Nyquist frequency which is ½ of sampling frequency when the signal indicative of the image of the motion region is made discrete.

Similarly with above, also in the configuration of the integrated circuit, it is possible to output a signal obtained by carrying out a nonlinear process with respect to the motion region signal indicative of an image of the motion region of a moving image.

Accordingly, the signal processing device and the integrated circuit of the present invention can steepen rising and falling of a signal corresponding to an edge portion included in a motion region signal indicative of an image of a motion region. In particular, the signal processing device and the integrated circuit of the present invention can further steepen rising and falling of a signal corresponding to the edge portion compared with a conventional sharpening process employing linear operation.

As a result, the signal processing device and the integrated circuit of the present invention can highly sharpen an image of a motion region, so that the signal processing device and the integrated circuit of the present invention can greatly reduce motion image blur in the motion region of a moving image, thereby improving image quality and giving feeling that resolution is increased.

A signal processing device of the present invention is a signal processing device that subjects a signal indicative of a moving image constituted by a plurality of temporarily consecutive frames to a sharpening process for the moving image, to output a signal indicative of a moving image thus sharpened, the signal processing device comprising: motion detection means for detecting motion between the frames with respect to each block region consisting of one or a plurality of adjacent pixels constituting each of the frames; first high-frequency component generation means for generating a first sharpening signal by sharpening a signal indicative of a pixel group consisting of pixels positioned adjacently in a main scanning direction of a moving image of the block region from which the motion has been detected by the motion detection means; second high-frequency component generation means for generating a second sharpening signal by sharpening a signal indicative of a pixel group consisting of pixels positioned adjacently in a sub-scanning direction of the moving image represented by the first sharpening signal; and signal output means for outputting, with respect to the block region from which the motion has been detected by the motion detection means, the second sharpening signal having been produced by sharpening a motion region signal that is a signal indicative of a moving image of the block region, while outputting, with respect to the block region from which the motion has not been detected by the motion detection means, a non-motion region signal that is a signal indicative of a moving image of the block region, the first high-frequency component generation means including: first low-frequency component removing means for removing, from frequency components of a main scanning direction signal that is a signal indicative of a pixel group consisting of pixels positioned adjacently in a main scanning direction of a moving image of the block region from which the motion has been detected by the motion detection means, at least a direct current component, to generate and output a first low-frequency-free signal; first nonlinear process means for generating a first nonlinear process signal (i) in which positive and negative signs of the first low-frequency-free signal are retained and (ii) which broadly monotonically increases nonlinearly with respect to the first low-frequency-free signal when values of the first low-frequency-free signal are at least in the vicinity of 0; and first addition means for adding the first nonlinear process signal to the main scanning direction signal, to generate the first sharpening signal, the second high-frequency component generation means including: second low-frequency component removing means for removing, from frequency components of a sub-scanning direction signal that is a signal indicative of a pixel group consisting of pixels positioned adjacently in a sub-scanning direction of a moving image represented by the first sharpening signal, at least a direct current component, to generate a second low-frequency-free signal; second nonlinear process means for generating and outputting a second nonlinear process signal (i) in which positive and negative signs of the second low-frequency-free signal are retained and (ii) which broadly monotonically increases nonlinearly with respect to the second low-frequency-free signal when values of the second low-frequency-free signal are at least in the vicinity of 0; and second addition means for adding the second nonlinear process signal to the sub-scanning direction signal, to generate the second sharpening signal.

With the arrangement, motion between frames is detected with respect to each block region, and a first sharpening signal is generated by sharpening a main scanning direction signal which is a signal indicative of a pixel group consisting of pixels positioned adjacently in a main scanning direction of a moving image of a block region from which motion has been detected (hereinafter motion region), and a second sharpening signal is generated by sharpening a sub scanning direction signal which is a signal indicative of a pixel group consisting of pixels positioned adjacently in a sub-scanning direction of a moving image represented by the first sharpening signal. With respect to the motion region, the second sharpening signal is outputted. With respect to a block region from which motion has not been detected (hereinafter still region), a non-motion region signal which is a signal indicative of a moving image of the still region is outputted.

When generating the first sharpening signal, initially, a first low-frequency-free signal is generated by removing at least a direct current component from frequency components of the signal indicative of the pixel group consisting of pixels positioned adjacently in the main scanning direction of the moving image of the motion region. Then, a first nonlinear process signal (i) in which positive and negative signs of the first low-frequency-free signal are retained and (ii) which broadly monotonically increases nonlinearly with respect to the first low-frequency-free signal when values of the first low-frequency-free signal are at least in the vicinity of 0 is generated. Then, the first sharpening signal is generated by adding the first nonlinear process signal to the main scanning direction signal.

Similarly, when generating the second sharpening signal, initially, a second low-frequency-free signal is generated by removing at least a direct current component from frequency components of the sub scanning direction signal which is a signal indicative of the pixel group consisting of pixels positioned adjacently in the sub scanning direction of the moving image indicated by the first sharpening signal. Then, a second nonlinear process signal (i) in which positive and negative signs of the second low-frequency-free signal are retained and (ii) which broadly monotonically increases nonlinearly with respect to the second low-frequency-free signal when values of the second low-frequency-free signal are at least in the vicinity of 0 is generated. Then, the second sharpening signal is generated by adding the second nonlinear process signal to the sub scanning direction signal.

Consequently, it is possible to output a signal obtained by carrying out a nonlinear process on a moving image of a motion region in a main scanning direction and a sub scanning direction of the moving image of the motion region.

The first sharpening signal is generated by adding, to the main scanning direction signal, the first nonlinear process signal obtained by a nonlinear process such as squaring the first low-frequency-free signal. The generated signal retains positive and negative signs of the first low-frequency-free signal. Similarly, the second sharpening signal is generated by adding, to the sub scanning direction signal, the second nonlinear process signal obtained by a nonlinear process such as squaring the second low-frequency-free signal. The generated signal retains positive and negative signs of the second low-frequency-free signal.

Consequently, the second sharpening signal includes a high band frequency component which is not included in frequency components of a signal indicative of an image of a motion region. As a result, the second sharpening signal includes a frequency component higher than Nyquist frequency which is ½ of sampling frequency when the signal indicative of the image of the motion region is made discrete.

Accordingly, the signal processing device of the present invention can steepen rising and falling of a signal corresponding to an edge portion included in a signal indicative of an image of a motion region. In particular, the signal processing device of the present invention can further steepen rising and falling of a signal corresponding to the edge portion compared with a conventional sharpening process employing linear operation.

As a result, the signal processing device of the present invention can highly sharpen an image of a motion region, so that the signal processing device of the present invention can greatly reduce motion image blur in the motion region of a moving image, thereby improving image quality and giving feeling that resolution is increased.

Advantageous Effects of Invention

As described above, the signal processing device of the present invention is a signal processing device that subjects a signal indicative of a moving image constituted by a plurality of temporarily consecutive frames to a sharpening process for the moving image, to output a signal indicative of a moving image thus sharpened, the signal processing device including: motion detection means for detecting motion between the frames with respect to each block region consisting of one or a plurality of adjacent pixels constituting each of the frames; first high-frequency component generation means for generating a harmonic having been produced by sharpening a signal indicative of a moving image of the block region from which the motion has been detected by the motion detection means; and signal output means for outputting, with respect to the block region from which the motion has been detected by the motion detection means, the harmonic having been produced by sharpening a motion region signal that is a signal indicative of a moving image of the block region, while outputting, with respect to the block region from which the motion has not been detected by the motion detection means, a non-motion region signal that is a signal indicative of a moving image of the block region, the first high-frequency component generation means including: first low-frequency component removing means for removing, from frequency components of the motion region signal, at least a direct current component, to generate and output a first low-frequency-free signal; first nonlinear process means for receiving the first low-frequency-free signal, generating a first nonlinear process signal (i) in which positive and negative signs of the first low-frequency-free signal are retained and (ii) which broadly monotonically increases nonlinearly with respect to the first low-frequency-free signal when values of the first low-frequency-free signal are at least in the vicinity of 0, and outputting the first nonlinear process signal; and addition means for adding the first nonlinear process signal to the motion region signal, to generate the harmonic.

Furthermore, the integrated circuit of the present invention is an integrated circuit that subjects a signal indicative of a moving image constituted by a plurality of temporarily consecutive frames to a sharpening process for the moving image, to output a signal indicative of a moving image thus sharpened, the integrated circuit including: a motion detection circuit that detects motion between the frames with respect to each block region consisting of one or a plurality of adjacent pixels constituting each of the frames; a high-frequency component generation circuit that generates a harmonic having been produced by sharpening a signal indicative of a moving image of the block region from which the motion has been detected by the motion detection circuit; a signal output circuit that outputs, with respect to the block region from which the motion has been detected by the motion detection circuit, the harmonic having been produced by sharpening a motion region signal that is a signal indicative of a moving image of the block region, while outputting, with respect to the block region from which the motion has not been detected by the motion detection circuit, a non-motion region signal that is a signal indicative of a moving image of the block region, the high-frequency component generation circuit including: a low-frequency component removing circuit that removes, from frequency components of the motion region signal, at least a direct current component, to generate a low-frequency-free signal; a nonlinear process circuit that receives the low-frequency-free signal, generates a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0, and outputs the nonlinear process signal; and an addition circuit that adds the nonlinear process signal to the motion region signal, to generate the harmonic.

Consequently, it is possible to output a signal obtained by carrying out a nonlinear process with respect to the motion region signal indicative of an image of the motion region of a moving image.

Accordingly, it is possible to steepen rising and falling of a signal corresponding to an edge portion included in a motion region signal indicative of an image of a motion region. In particular, it is possible to further steepen rising and falling of a signal corresponding to the edge portion compared with a conventional sharpening process employing linear operation.

As a result, the signal processing device and the integrated circuit of the present invention can highly sharpen an image of a motion region, so that the signal processing device and the integrated circuit of the present invention can greatly reduce motion image blur in the motion region of a moving image, thereby improving image quality and giving feeling that resolution is increased.

Furthermore, a signal processing device of the present invention is a signal processing device that subjects a signal indicative of a moving image constituted by a plurality of temporarily consecutive frames to a sharpening process for the moving image, to output a signal indicative of a moving image thus sharpened, the signal processing device comprising: motion detection means for detecting motion between the frames with respect to each block region consisting of one or a plurality of adjacent pixels constituting each of the frames; first high-frequency component generation means for generating a first sharpening signal by sharpening a signal indicative of a pixel group consisting of pixels positioned adjacently in a main scanning direction of a moving image of the block region from which the motion has been detected by the motion detection means; second high-frequency component generation means for generating a second sharpening signal by sharpening a signal indicative of a pixel group consisting of pixels positioned adjacently in a sub-scanning direction of the moving image represented by the first sharpening signal; and signal output means for outputting, with respect to the block region from which the motion has been detected by the motion detection means, the second sharpening signal having been produced by sharpening a motion region signal that is a signal indicative of a moving image of the block region, while outputting, with respect to the block region from which the motion has not been detected by the motion detection means, a non-motion region signal that is a signal indicative of a moving image of the block region, the first high-frequency component generation means including: first low-frequency component removing means for removing, from frequency components of a main scanning direction signal that is a signal indicative of a pixel group consisting of pixels positioned adjacently in a main scanning direction of a moving image of the block region from which the motion has been detected by the motion detection means, at least a direct current component, to generate and output a first low-frequency-free signal; first nonlinear process means for generating a first nonlinear process signal (i) in which positive and negative signs of the first low-frequency-free signal are retained and (ii) which broadly monotonically increases nonlinearly with respect to the first low-frequency-free signal when values of the first low-frequency-free signal are at least in the vicinity of 0; and first addition means for adding the first nonlinear process signal to the main scanning direction signal, to generate the first sharpening signal, the second high-frequency component generation means including: second low-frequency component removing means for removing, from frequency components of a sub-scanning direction signal that is a signal indicative of a pixel group consisting of pixels positioned adjacently in a sub-scanning direction of a moving image represented by the first sharpening signal, at least a direct current component, to generate a second low-frequency-free signal; second nonlinear process means for generating and outputting a second nonlinear process signal (i) in which positive and negative signs of the second low-frequency-free signal are retained and (ii) which broadly monotonically increases nonlinearly with respect to the second low-frequency-free signal when values of the second low-frequency-free signal are at least in the vicinity of 0; and second addition means for adding the second nonlinear process signal to the sub-scanning direction signal, to generate the second sharpening signal.

Consequently, it is possible to output a signal obtained by carrying out a nonlinear process on a moving image of a motion region in a main scanning direction and a sub scanning direction of the moving image of the motion region.

Accordingly, it is possible to steepen rising and falling of a signal corresponding to an edge portion included in a signal indicative of an image of a motion region. In particular, it is possible to further steepen rising and falling of a signal corresponding to the edge portion compared with a conventional sharpening process employing linear operation.

As a result, the signal processing device of the present invention can highly sharpen an image of a motion region, so that the signal processing device of the present invention can greatly reduce motion image blur in the motion region of a moving image, thereby improving image quality and giving feeling that resolution is increased.

For a fuller understanding of the nature and advantages of the invention, reference should be made to the ensuing detailed description taken in conjunction with the accompanying drawings.

BRIEF DESCRIPTION OF DRAWINGS

FIG. 1 is a block diagram showing a configuration of a signal processing device in accordance with an embodiment of the present invention.

FIG. 2 is a block diagram showing a configuration of a sharpening process section included in a signal processing device of the present invention.

FIG. 3 is a block diagram showing a high-frequency component extracting section included in the sharpening process section shown in FIG. 2.

FIG. 4 is a block diagram showing another configuration example of a filter included in the high-frequency component extracting section shown in FIG. 3.

Figure 2:
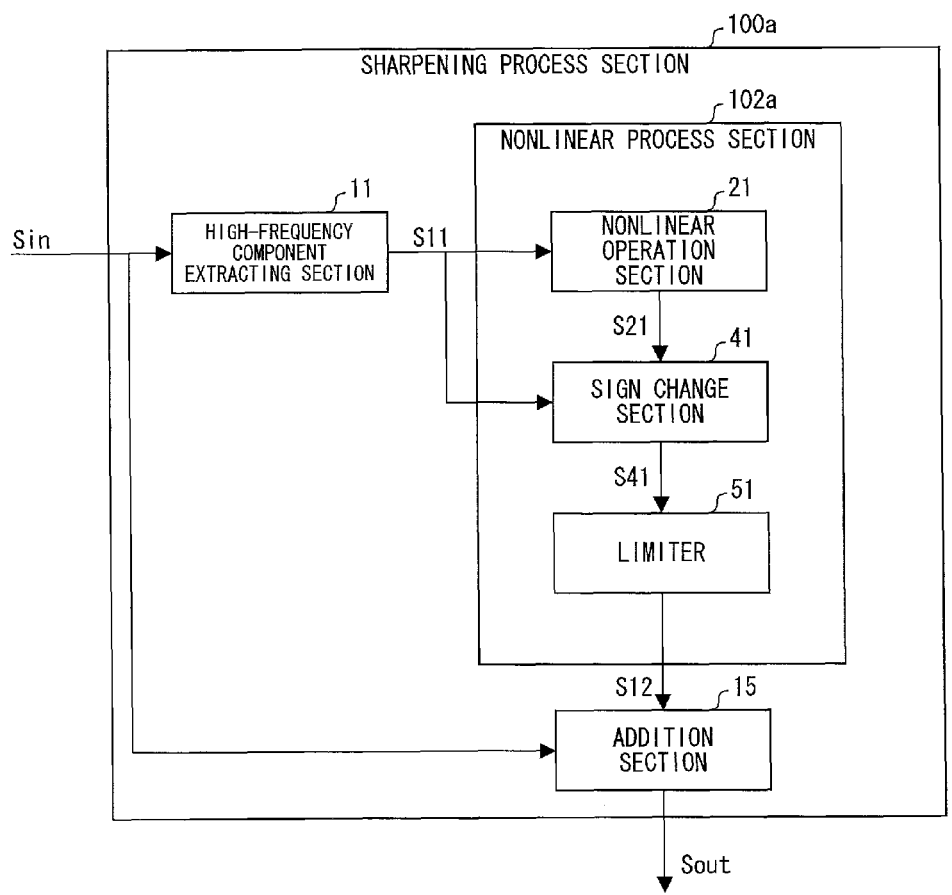
FIG. 2
Figure 5:
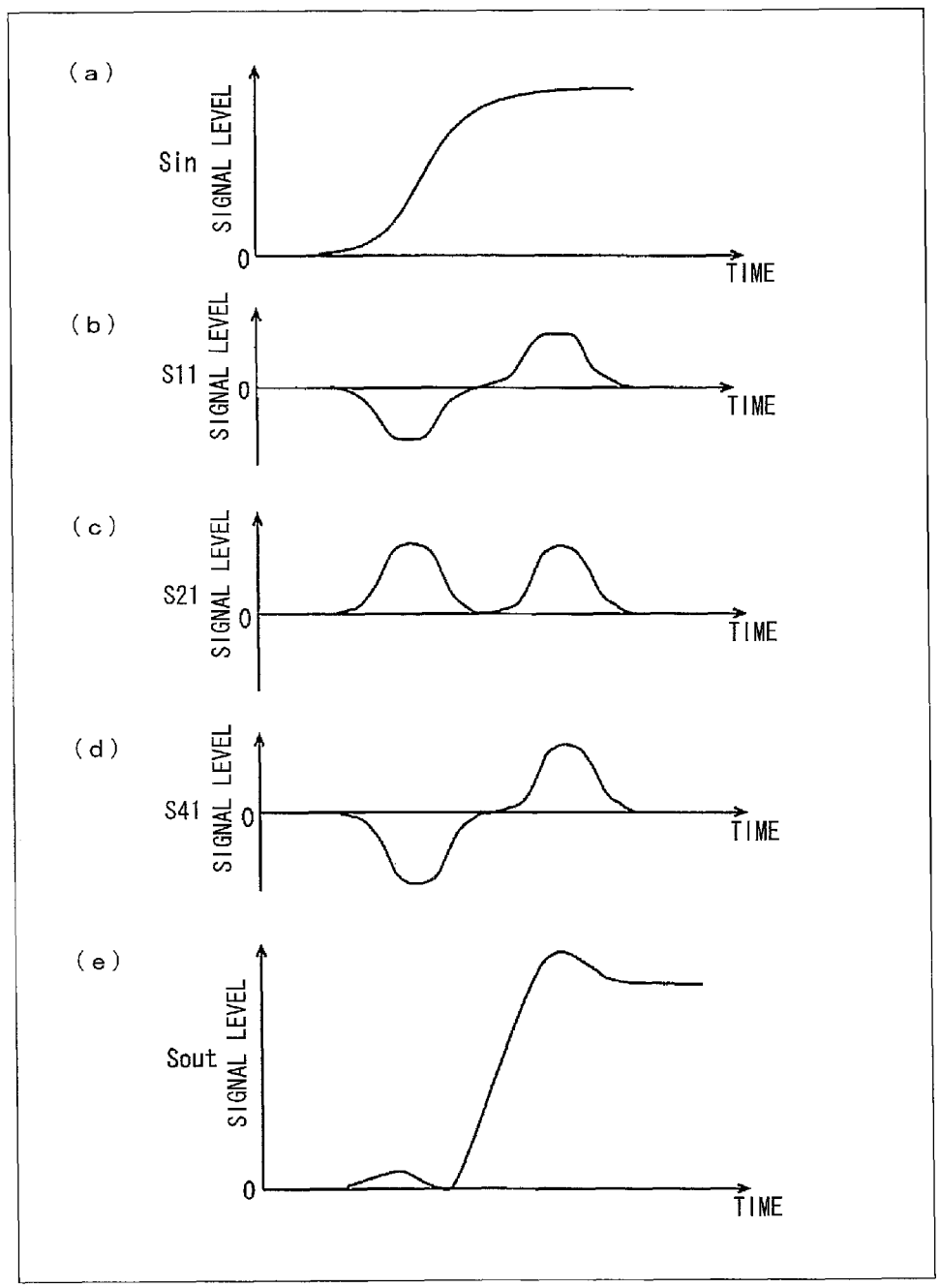
FIG. 5

(a) of FIG. 5 schematically shows a waveform of a signal inputted to the sharpening process section shown in FIG. 2. (b) of FIG. 5 schematically shows a waveform of a high-frequency signal generated by the sharpening process section shown in FIG. 2. (c) of FIG. 5 schematically shows a waveform of a nonlinear signal generated in the sharpening process section shown in FIG. 2. (d) of FIG. 5 schematically shows a waveform of a sign change signal generated in the sharpening process section shown in FIG. 2. (e) of FIG. 5 schematically shows a waveform of an output signal generated in the sharpening process section shown in FIG. 2.

FIG. 6

Figure 6:
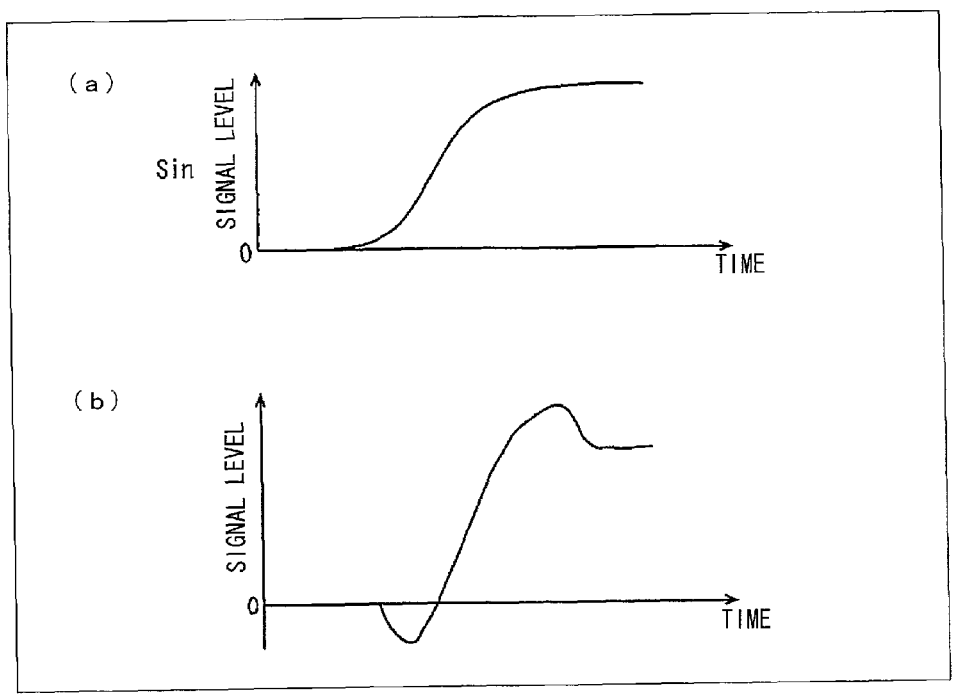

(a) of FIG. 6 is a drawing schematically showing a waveform of a signal inputted to the sharpening process section shown in FIG. 2. (b) of FIG. 6 is a drawing schematically showing a waveform obtained by enhancing, according to the prior art, the waveform of the signal shown in (a) of FIG. 6.

FIG. 7

Figure 7:
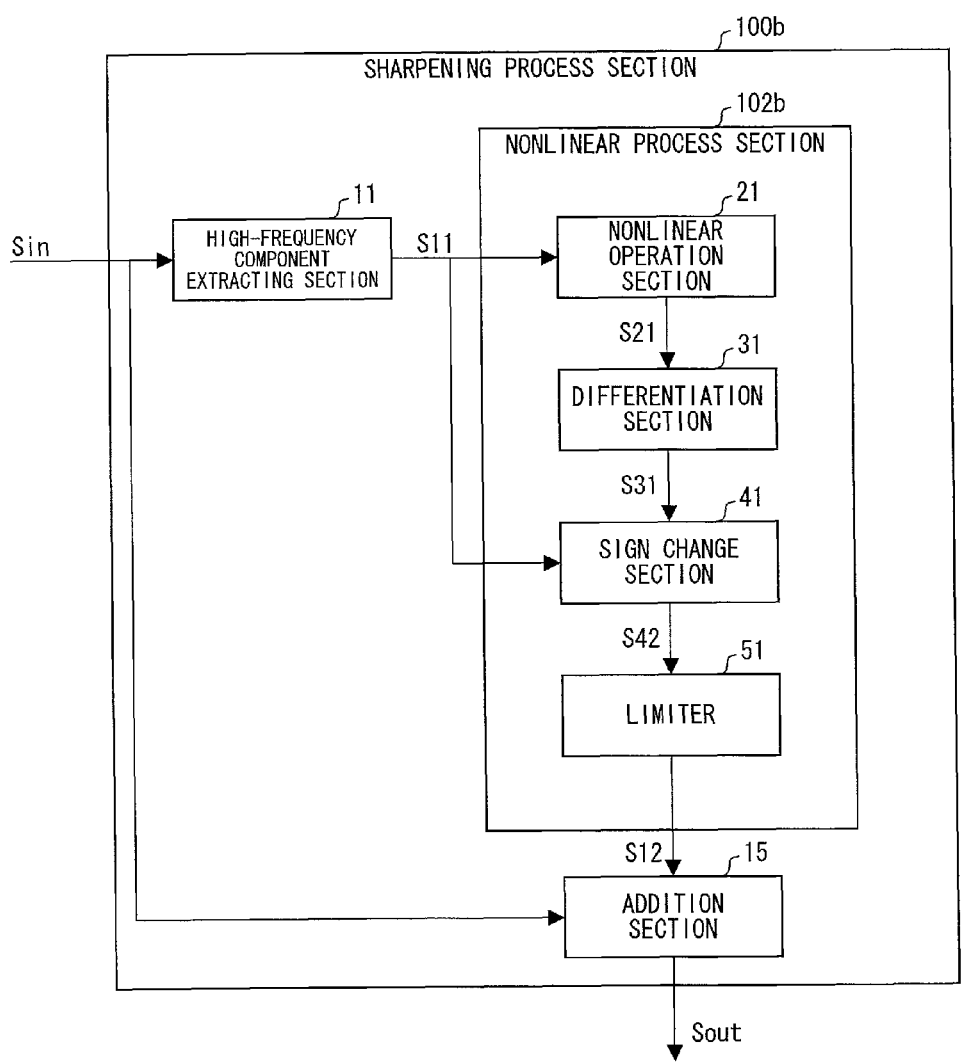

FIG. 7 is a block diagram showing another configuration of the sharpening process section included in the signal processing device of the present invention.

FIG. 8

Figure 8:
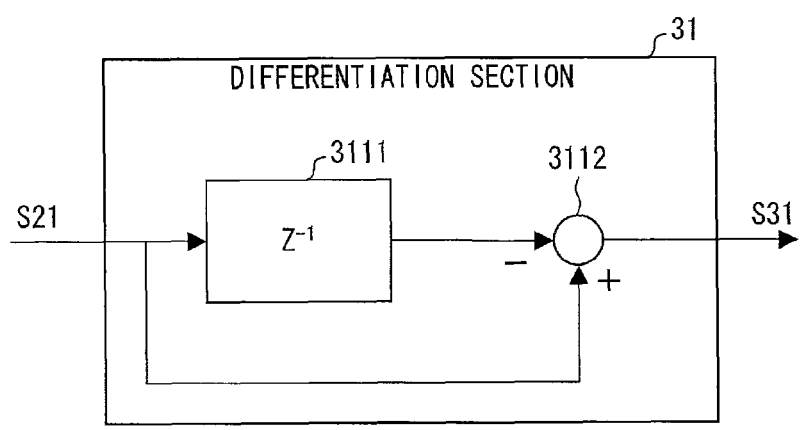

FIG. 8 is a block diagram showing a configuration of a differentiation section included in the sharpening process section shown in FIG. 7.

FIG. 9

Figure 9:
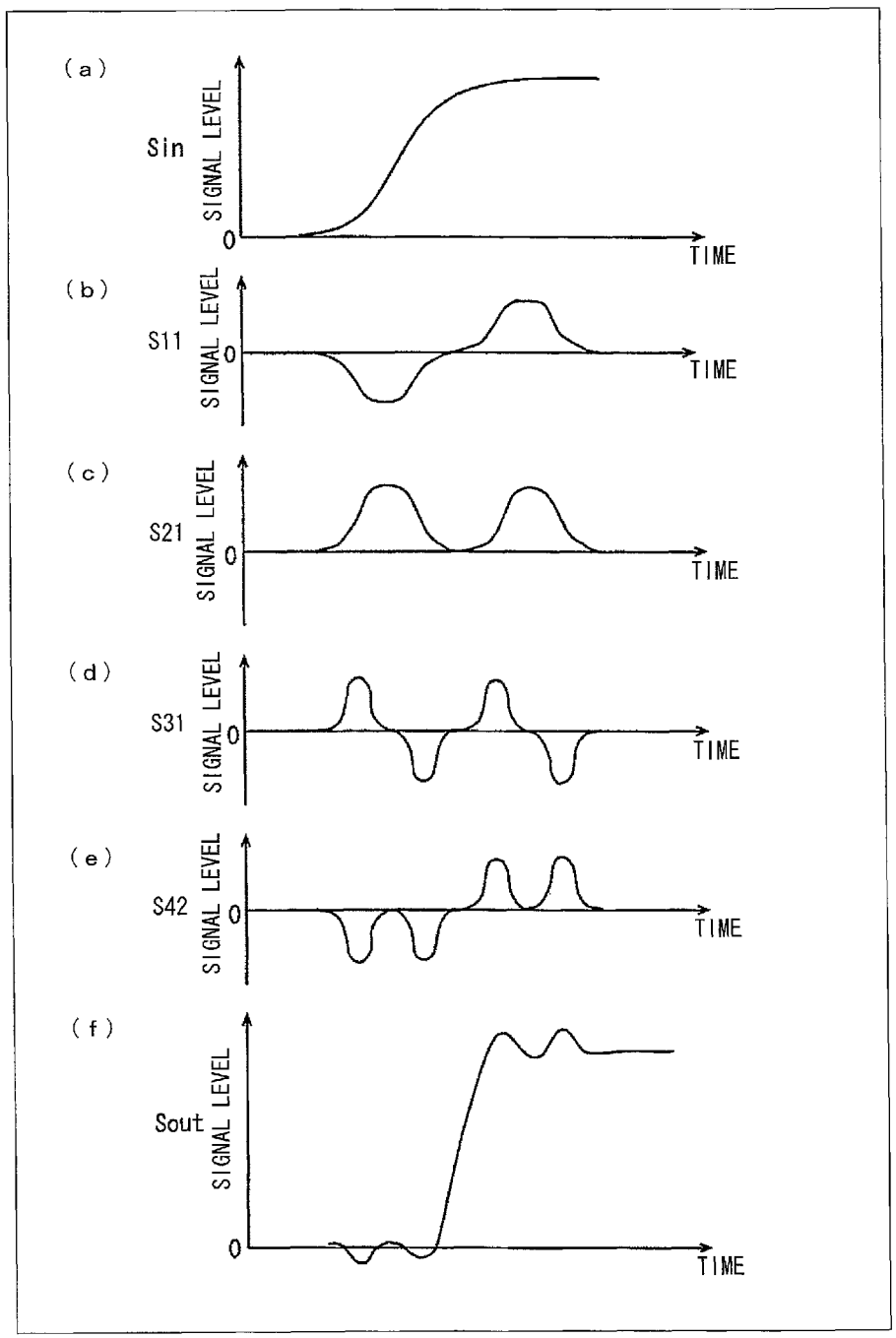

(a) of FIG. 9 schematically shows a waveform of a signal inputted to the sharpening process section shown in FIG. 7. (b) of FIG. 9 schematically shows a waveform of a high-frequency signal generated in the sharpening process section shown in FIG. 7. (c) of FIG. 9 schematically shows a waveform of a nonlinear signal generated in the sharpening process section shown in FIG. 7. (d) of FIG. 9 schematically shows a waveform of a differentiation signal generated in the sharpening process section shown in FIG. 7. (e) of FIG. 9 schematically shows a waveform of a sign change signal generated in the sharpening process section shown in FIG. 7. (f) of FIG. 9 schematically shows a waveform of an output signal generated in the sharpening process section shown in FIG. 7.

FIG. 10

Figure 10:
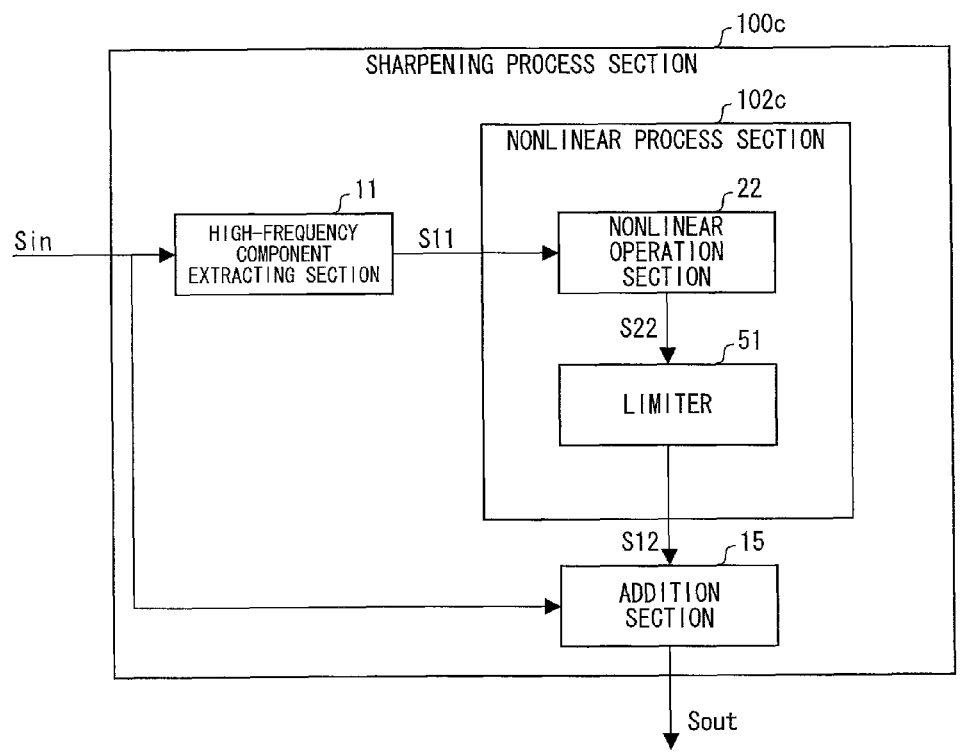

FIG. 10 is a block diagram showing yet another configuration of the sharpening process section included in the signal processing device of the present invention.

FIG. 11

Figure 11:
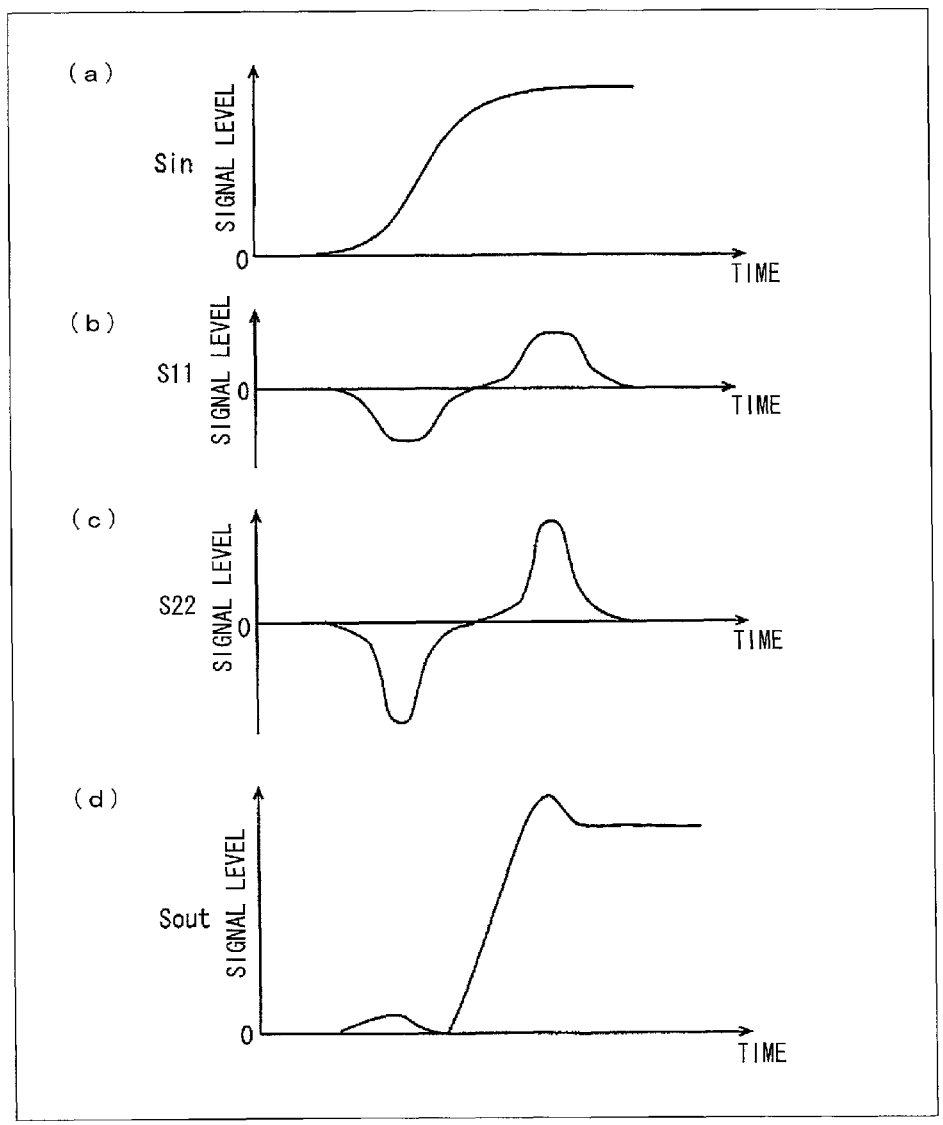

(a) of FIG. 11 schematically shows a waveform of a signal inputted to the sharpening process section shown in FIG. 10. (b) of FIG. 11 schematically shows a waveform of a high-frequency signal generated in the sharpening process section of FIG. 10. (c) of FIG. 11 schematically shows a waveform of a nonlinear signal generated in the sharpening process section shown in FIG. 10. (d) of FIG. 11 schematically shows a waveform of an output signal generated in the sharpening process section shown in FIG. 10.

FIG. 12

Figure 12:
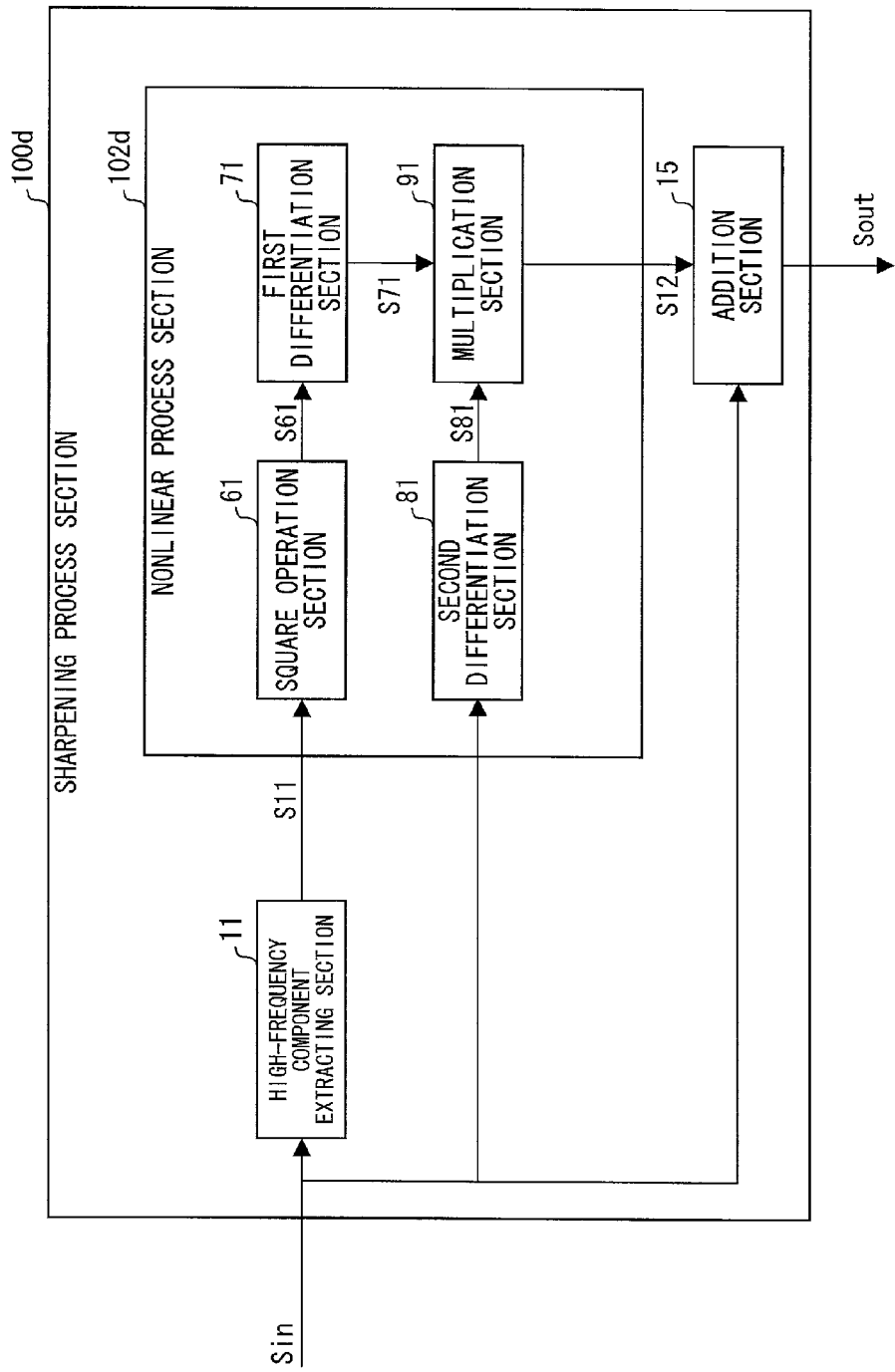

FIG. 12 is a block diagram showing yet another configuration of the sharpening process section included in the signal process device of the present invention.

FIG. 13

Figure 13:
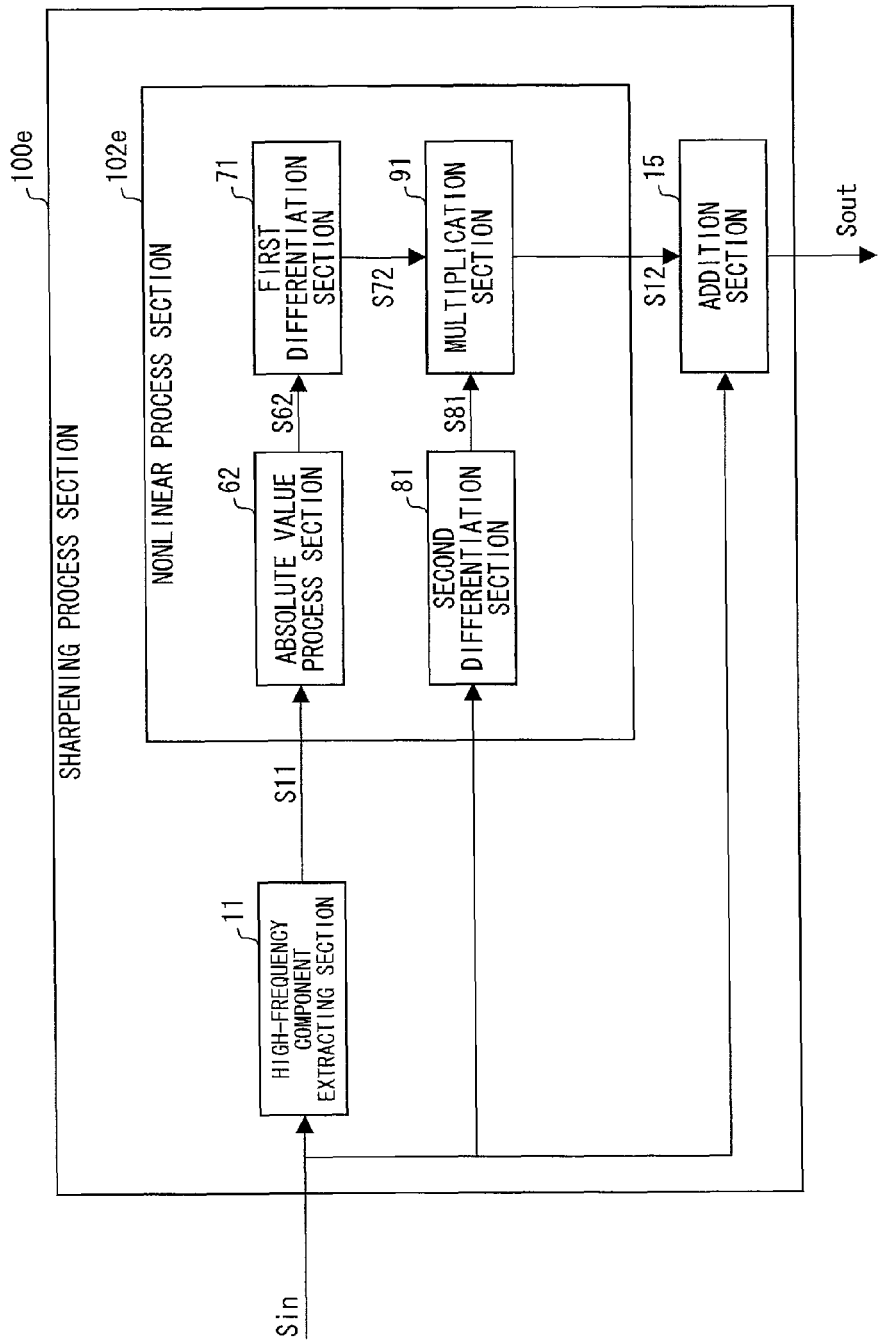

FIG. 13 is a block diagram showing yet another configuration of the sharpening process section included in the signal process device of the present invention.

FIG. 14

Figure 14:
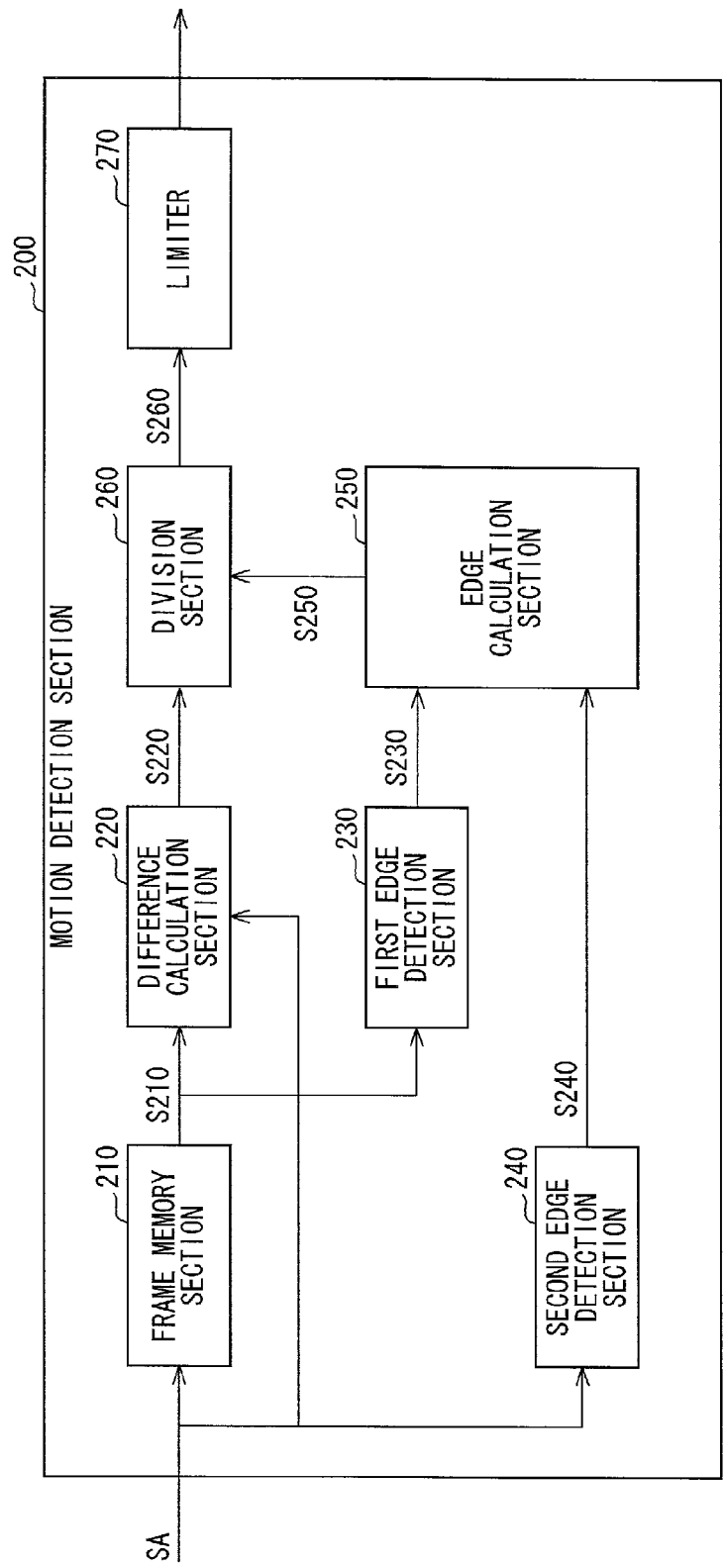

FIG. 14 is a block diagram showing a configuration example of a motion detection section included in the signal processing device of the present invention.

FIG. 15

Figure 15:
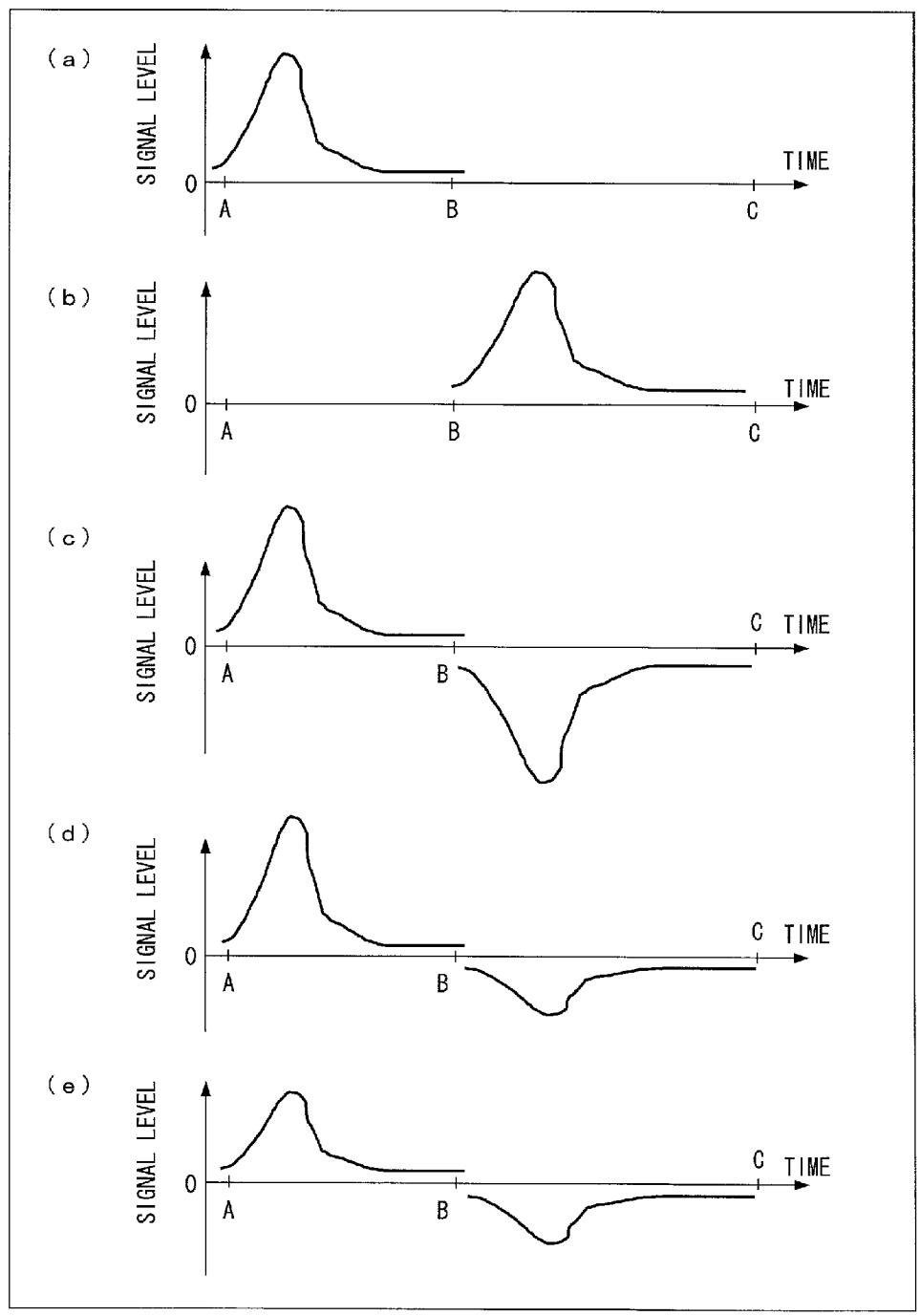

(a) of FIG. 15 is a schematic view showing a waveform of a signal in an M-th frame. (b) of FIG. 15 is a schematic view showing a waveform of a signal in an M+1-th frame. (c) of FIG. 15 is a schematic view showing a difference (frame difference) between the signal shown in (a) of FIG. 15 and the signal shown in (b) of FIG. 15. (d) of FIG. 15 is a schematic view showing a waveform of a signal obtained by dividing the frame difference shown in (c) of FIG. 15 by an edge component in the M+1-th frame. (e) of FIG. 15 is a schematic view showing a waveform of a signal obtained by dividing the frame difference shown in (c) of FIG. 15 by an edge signal calculated from an edge component in the M-th frame and an edge component in the M+1-th frame.

FIG. 16

Figure 1:
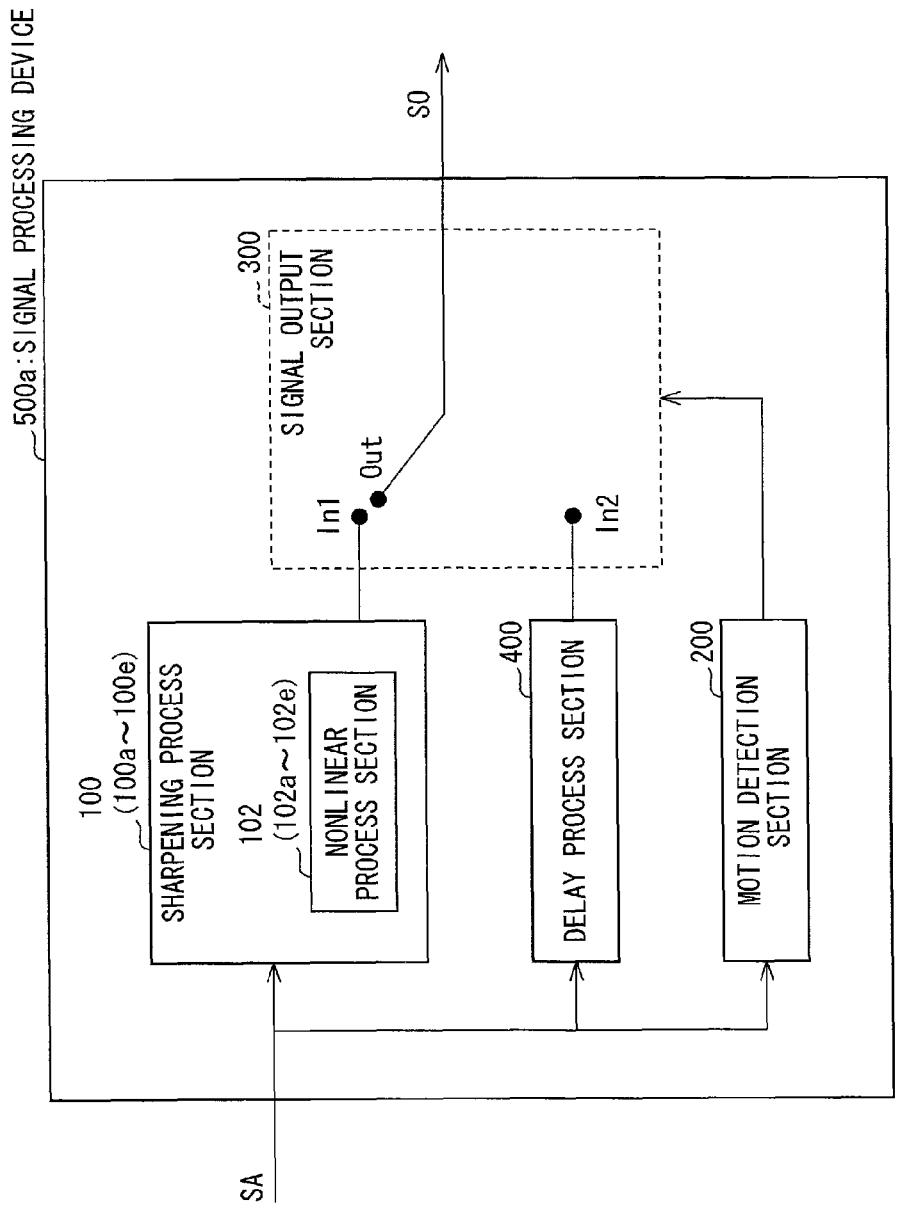
FIG. 1
Figure 16:
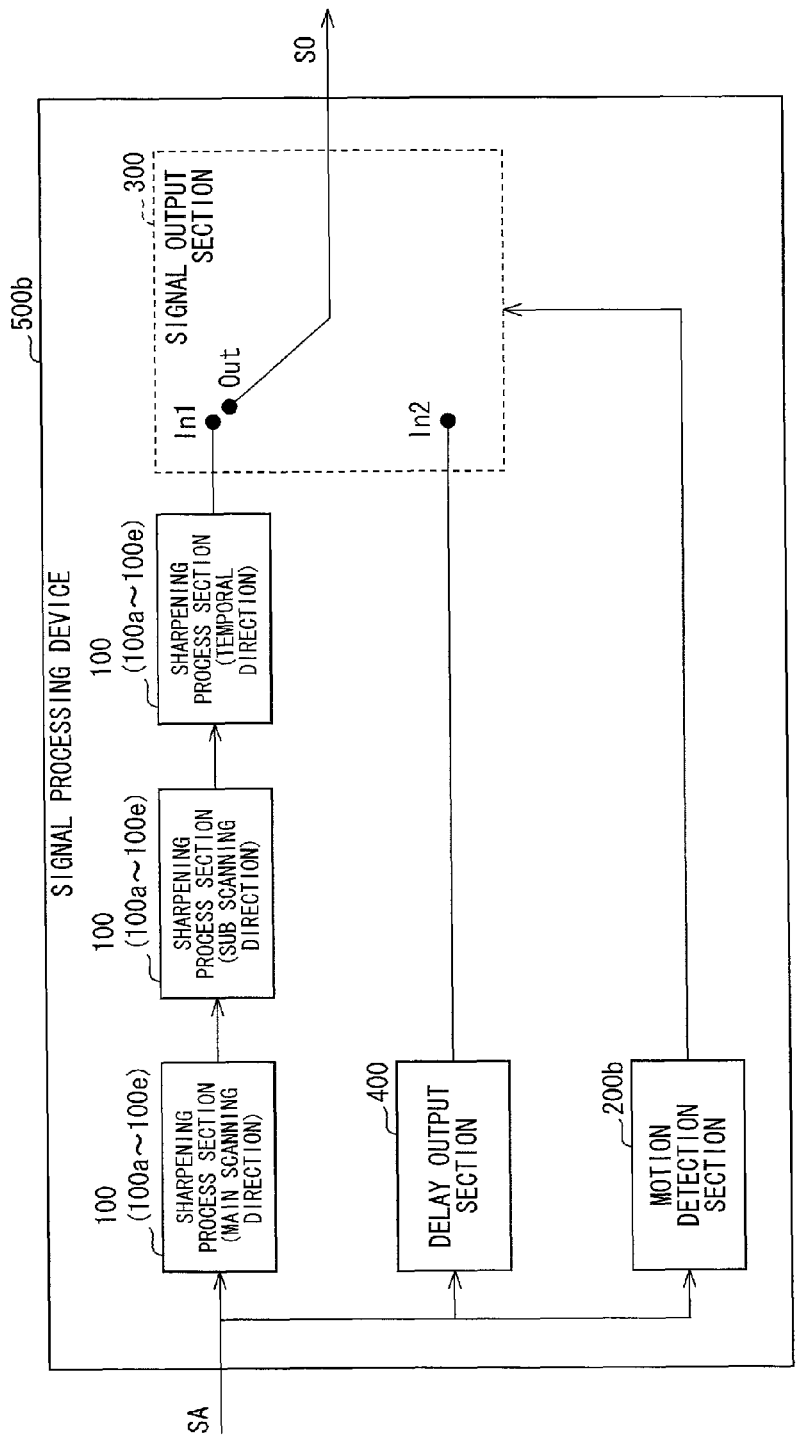

FIG. 16 is a block diagram showing an application example of the signal processing device shown in FIG. 1.

FIG. 17

Figure 17:
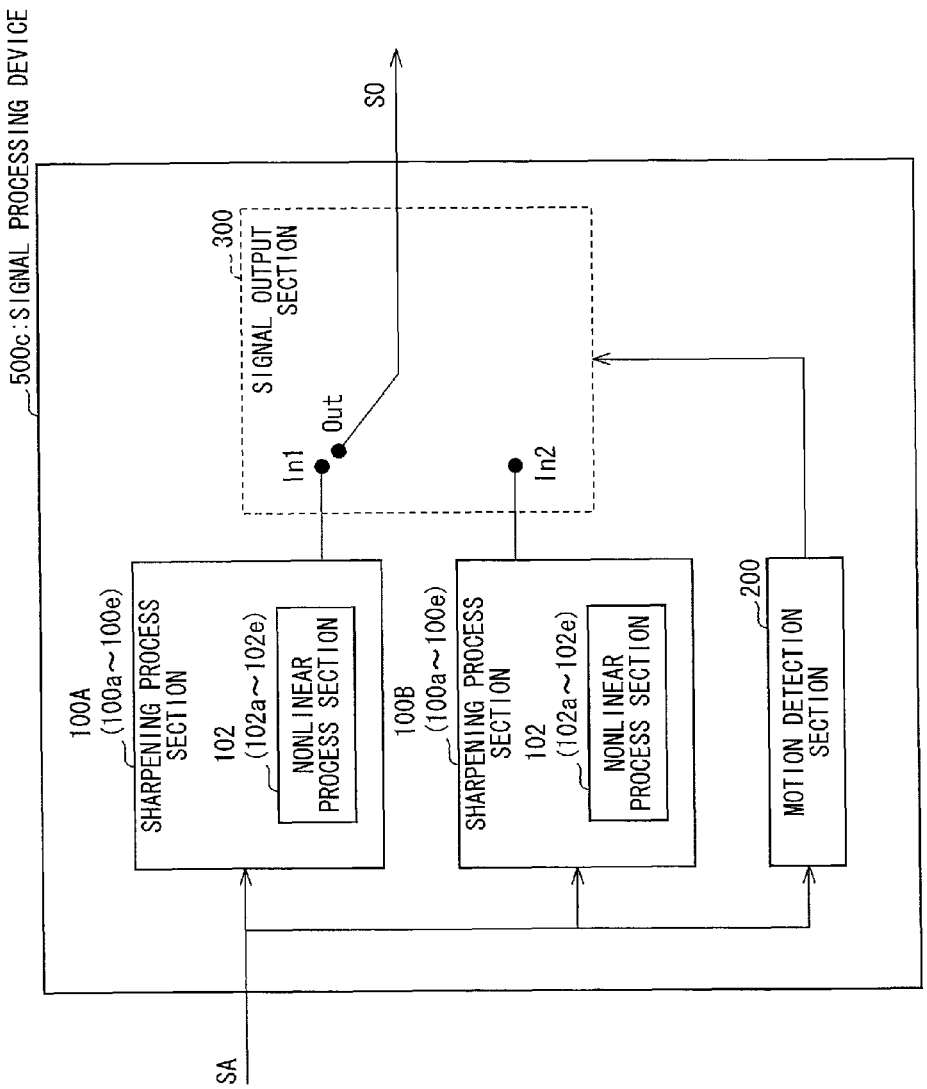

FIG. 17 is a block diagram showing a configuration of a signal processing device in accordance with another embodiment of the present invention.

FIG. 18

Figure 18:
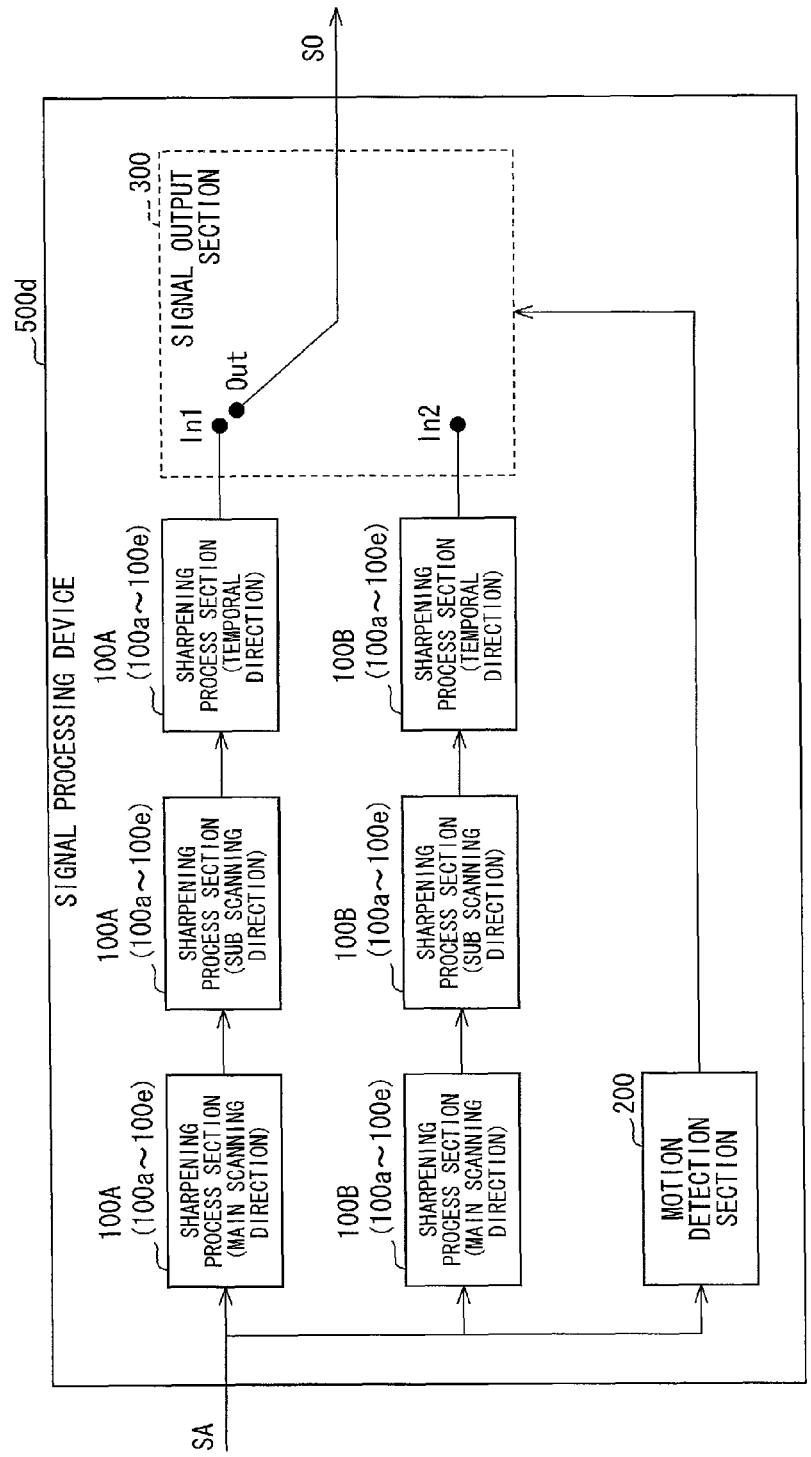

FIG. 18 is a block diagram showing an application example of the signal processing device shown in FIG. 17.

DESCRIPTION OF EMBODIMENTS

Outline of Signal Processing Device

Schematically, a signal processing device (integrated circuit) 500 in accordance with embodiments of the present invention is a device for subjecting a digital signal indicative of a moving image (hereinafter also referred to as image signal) to a sharpening process for sharpening a moving image. Here, the sharpening process is a process for carrying out later-mentioned nonlinear operation so as to steepen (enhance) rising and falling of a signal corresponding to a contour portion (edge) included in a moving image.

It should be noted that in a case where later-mentioned signal processing devices 500a-500d are not distinguished from each other, they are merely referred to as "signal processing device 500". Hereinafter, an image signal to be inputted to the signal processing device 500 is referred to as an input signal SA. An image signal outputted from the signal processing device 500 is referred to as an output signal SO.

As mentioned later, a sharpening process section (first high-frequency component generation means, second high-frequency component generation means, third high-frequency component generation means, fourth high-frequency component generation means, high frequency component generation circuit) 100 of the signal processing device 500 can incorporate a high frequency component which is not included in an input signal (specifically, a frequency component higher than Nyquist frequency which is ½ of sampling frequency when an input signal is made discrete) into an output signal. Therefore, by the signal processing device 500 carrying out a sharpening process, it is possible to further steepen rising and falling of a signal corresponding to an edge included in an image, compared with a case of a sharpening process using linear operation in the conventional technique.

A moving image indicated by the input signal SA is displayed in real time by a receiver of SDTV (Standard Definition Television), HDTV (High Definition Television) etc. A moving image consists of a plurality of temporally consecutive frames (screens).

In the following, an explanation is made as to a case where the input signal SA is a data sequence (sequence of pixel values) consisting of pixel values of pixels positioned adjacently in a main scanning direction (horizontal direction, lateral direction) of an image. Alternatively, the input signal SA may be a data sequence consisting of pixel values of pixels positioned adjacently in a sub-scanning direction (vertical direction, longitudinal direction) of an image.

(Outline of Sharpening Process Section)

Next, an explanation is made as to an outline of a sharpening process 100 which is a component of the signal processing device 500. The sharpening process section 100 may be any one of later-mentioned sharpening process sections 100a-100e. In a case where the sharpening process sections 100a-100e are not distinguished from each other, they are merely referred to as "sharpening process section 100".

The sharpening process section 100 subjects a signal inputted thereto to a sharpening process for sharpening a waveform, and outputs the sharpened signal. Here, the sharpening process is a process for steepening (enhancing) rising and falling of an input signal. In particular, in a case where an input signal indicates an image, the sharpening process steepens rising and falling of a signal corresponding to a contour portion (edge) of an image.

Hereinafter, a signal inputted to the sharpening process section 100 is also referred to as an input signal Sin. A signal outputted from the sharpening process section 100 is also referred to as an output signal Sout (harmonic, first sharpening signal, second sharpening signal).

As described later, the sharpening process section 100 includes at least a nonlinear process section (first nonlinear process means, second nonlinear process means, third nonlinear process means, fourth nonlinear process means, nonlinear process circuit) 102. In a case where later-mentioned nonlinear process sections 102a-102e are not distinguished from each other, they are merely referred to as "nonlinear process section 102".

The sharpening process section 100 causes the nonlinear process section 102 to carry out nonlinear operation with respect to a high frequency component of the input signal Sin, so that the sharpening process section 100 can incorporate a high frequency component which is not included in the input signal Sin (specifically, a frequency component higher than Nyquist frequency which is ½ of sampling frequency when the input signal Sin is made discrete) into an output signal Sout. Therefore, by the sharpening process section 100 carrying out the sharpening process, it is possible to further steepen rising and falling of the input signal Sin, compared with a sharpening process using linear operation. It should be noted that the output signal Sout is also referred to as a harmonic of the input signal Sin.

The configuration of the sharpening process section 100 will be detailed later.

First Embodiment

The following explains an embodiment of the present invention with reference to FIGS. 1 to 16. The signal processing device 500 in accordance with the present embodiment is referred to as the signal processing device 500a.

The signal processing device 500a is a device for carrying out a sharpening process with respect to a motion region of a moving image indicated by the input signal SA. In a moving image, a motion region is likely to show much blur. Therefore, by carrying out the sharpening process with respect to the motion region, it is possible to give feeling that a resolution of the moving image is increased.

"Motion region" in the specification indicates a region where motion is observed between frames. The "motion region" may be all the regions which are not in stationary states, or may be only a region where motion is observed to some extent (motion amount is not less than a predetermined threshold).

The sharpening process on a moving image is carried out in a main-scanning direction (lateral direction, horizontal direction), a sub-scanning direction (longitudinal direction, vertical direction), and a temporal direction. However, in the explanation of the configuration of the signal processing device 500a, the direction in which the sharpening process is carried out is not particularly mentioned. The sharpening process in the main scanning direction, the sub-scanning direction, and the temporal direction will be mentioned later.

(Configuration of Signal Processing Device)

With reference to FIG. 1, an explanation is made as to the configuration of the signal processing device 500a. FIG. 1 is a block diagram showing the configuration of the signal processing device 500a. As shown in the drawing, the signal processing device 500a includes a sharpening process section 100, a motion detection section (motion detection means) 200, a signal output section (signal output generation means) 300, and a delay process section 400.

The sharpening process section 100 carries out nonlinear operation with respect to a high frequency component of the input signal SA as above, thereby outputting a harmonic of the input signal SA. The configuration of the sharpening process section 100 will be detailed later.

The motion detection section 200 detects motion between frames with respect to each block region consisting of one or a plurality of adjacent pixels in a frame constituting a moving image represented by the input signal SA. The block region is preferably (1) a region consisting of 1 pixel or (2) a region consisting of 4 pixels×4 pixels (16 pixels), but not limited to them. Furthermore, it is not necessarily required to detect motion displayed by all pixels in a block region, and motion displayed by at least one pixel in the block region may be detected.

How to detect motion is not particularly limited, and motion may be detected in various ways. For example, motion may be detected by simply obtaining difference between frames, or motion may be detected by a later-mentioned configuration shown in FIG. 14.

The motion detection section 200 informs the signal output section 300 of the result of detection of motion with respect to each block region.

The signal output section 300 is a switch for connecting a connection point Out with a connection point In1 or a connection point In2 in accordance with the result of detection of motion by the motion detection section 200. Specifically, when the motion detection section 200 detects a motion, the signal output section 300 connects the connection point Out with the connection point In1. In this case, a signal from the sharpening process section 100 (motion region signal) is outputted as an output signal SO from the signal output section 300. On the other hand, when the motion detection section 200 does not detect motion, the signal output section 300 connects the connection point Out with the connection point In2. In this case, a signal from the delay process section 400 (non-motion region signal) is outputted as an output signal SO from the signal output section 300.

The delay process section 400 is a delay circuit for adjusting timing between the input signal SA and a signal outputted from the sharpening process section 100, and includes a delay element.

With the above arrangement, with respect to a block region where motion is detected by the motion detection section 200, the signal output section 300 outputs the output signal Sout from the sharpening process section 100 as the output signal SO. On the other hand, with respect to a block region where no motion is detected by the motion detection section 200, the signal output section 300 outputs the input signal SA as the output signal SO without any modification.

(Configuration of Sharpening Process Section)

The following details the configuration of the sharpening process section 100.

(Configuration Example 1 of Sharpening Process Section)

FIG. 2 is a block diagram showing a configuration of a sharpening process section 100a. As shown in FIG. 5, the sharpening process section 100a includes a high-frequency component extracting section (first low-frequency component removing means, second low-frequency component removing means, third low-frequency component removing means, fourth low-frequency component removing means, low-frequency component removing circuit) 11, a nonlinear process section 102a, and an addition section (first addition means, second addition means, third addition means, fourth addition means, addition circuit) 15.

Figure 3:
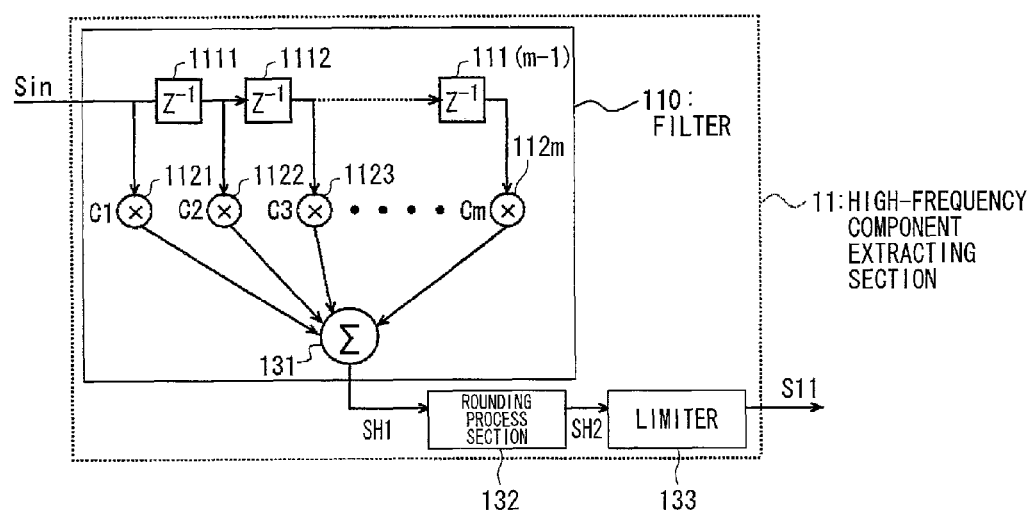
FIG. 3

First, an explanation is made as to the high frequency component extracting section 11. Schematically, the high frequency component extracting section 11 extracts a high frequency component in the input signal Sin and outputs the component as a high-frequency signal S11 (first low-frequency-free signal, second low-frequency-free signal, third low-frequency-free signal, fourth low-frequency-free signal, low-frequency-free signal). With reference to FIG. 3, an explanation is made as to a configuration of the high-frequency component extracting section 11. FIG. 3 is a block diagram showing the configuration of the high-frequency component extracting section 11.

As shown in FIG. 3, the high-frequency component extracting section 11 includes a filter 110, a rounding process section (low-level signal removing means) 132, and a limiter (high-level signal removing means) 133.

The filter 110 is an m-tap transversal high-pass filter including m−1 unit delay elements 111h (h=1, 2, . . . , m−1: m is a positive integer of 3 or greater), m multiplication sections 112k (k=1, 2, . . . , m), and an addition section 131. The filter 110 receives the input signal Sin as input and outputs a high band signal SH1.

Each of the unit delay elements 111h delays an input signal by unit time and outputs the delayed signal. The unit delay element 1111 (h=1) receives the input signal Sin.

Each of the multiplication sections 112k multiplies the input signal by a coefficient Ck, and outputs the result of the multiplication to the addition section 131. The coefficient Ck is set beforehand so that the filter 110 serves as a high-pass filter. For example, in a case where m=3, by setting C1, C2, and C3 to 0.5, −1, and 0.5, respectively, the filter 110 serves as a high-pass filter.

The addition section 131 adds signals from the addition sections 112k so as to generate the high band signal SH1.

Figure 4:
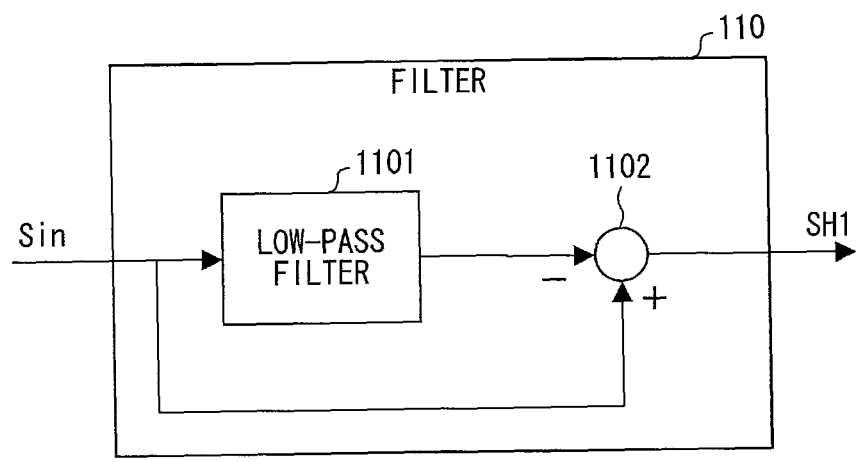
FIG. 4

As is generally known, a low-pass filter is easier to fabricate than fabricating a high-pass filter. Therefore, the filter 110 may be constituted of a low-pass filter. FIG. 4 shows another configuration example of the filter 110. As shown in FIG. 4, the filter 110 may be constituted of a low-pass filter 1101 and a subtraction section 1102.

In order not to amplify noises in the nonlinear process section 102 provided subsequently, the rounding process section 132 removes a low level signal which can be regarded as a noise in the high band signal SH1, thereby generating a low-level-free signal SH2.

Specifically, out of signal values of the high band signal SH1, the rounding process section 132 changes a signal value whose absolute value is not more than a predetermined lower limit LV to "0", thereby generating the low-level-free signal SH2.

For example, in a case where the input signal Sin can be any integer ranging from −255 to 255, when the lower limit LV is "2", the rounding process section 132 regards, as noises, all signal values whose absolute value is not more than "2" out of signal values of the high band signal SH1, and changes such signal values to "0" (i.e. rounds such signal values).

Subsequently, in order that a signal already having a sufficiently high energy is not further amplified in the nonlinear process section 102 provided subsequently, the limiter 133 removes a high-level signal value in the low-level-free signal SH2, thereby generating a high-frequency signal S11.

Specifically, in order that a signal value of the low-level-free signal SH2 is not more than a predetermined upper limit UV1, with respect to signal values of the low-level-free signal SH2, the limiter 133 carries out a process of changing signal values whose absolute values are more than the upper limit UV1 so that their absolute values are not more than the upper limit UV1 (hereinafter also referred to as a clipping process), thereby generating the high-frequency signal S11.

For example, out of signal values of the low-level-free signal SH2, signal values whose absolute values are more than "64" are changed to "64" or "−64" according to signs. Alternatively, the signal values may be changed to "0".

In a case where the input signal Sin is an 8-bit signal, the filter 110 adds, to the input signal Sin, a signal limited to be not more than 3rd MSB (approximately 64 or −64 in 8-bit signal) based on 12-bit calculation. Accordingly, the rounding process section 132 and the limiter 133 carry out a process of limiting the result of calculation by the filter 110 to 8-bit signals.

In the above explanation, the high-frequency component extracting section 11 includes the rounding process section 132 and the limiter 133. Alternatively, the high-frequency component extracting section 11 may include a member obtained by integrating the rounding process section 132 and the limiter 133 with each other.

Next, the nonlinear process section 102a is to be described. As shown in FIG. 2, the nonlinear process section 102a includes a nonlinear operation section (even exponentiation operation means, square root operation means) 21, a sign changing section (sign changing means) 41, and a limiter (first amplitude adjustment means, second amplitude adjustment means) 51.

The nonlinear operation section 21 carries out a nonlinear operation to the high-frequency signal S11, so as to generate a nonlinear signal S21.

The nonlinear operation which is carried out by the nonlinear operation section 21 is described here. The following description denotes a signal value to be supplied to the nonlinear operation section 21 as x, denotes a signal value to be supplied from the nonlinear operation section 21 as y, and expresses the nonlinear operation which is carried out by the nonlinear operation section 21 as a function y=f(x).

Assume here that the function f(x) is a nonlinear monotone increasing function which monotonically increases so as to be in positive and negative symmetry (origin symmetry). Note that "monotone increasing" means broad monotone increasing. However, it is only necessary that the function f(x) monotonically increase at least in the vicinity of x="0". It is preferable that the function f(x) be |f(x)|>|x| at least in the vicinity of x="0".

Such a function f(x) is exemplified by those expressed as the following expressions (1) through (3). Note that it is preferable that the functions f(x) expressed as the expressions (2) and (3) be used in an interval 0≤x≤1 since the functions f(x) greatly increase in the interval.

$$f(x)=x^{2n} (n \text{ is a natural number}) \quad (1)$$

$$f(x)=|x|^{1/2} \quad (2)$$

$$f(x)=|x|^{1/10} \quad (3)$$

In a case where the expression (1) is used as the function f(x), the nonlinear operation section 21 raises the high-frequency signal S11 to an even exponent not less than 2, so as to generate the nonlinear signal S21 (even exponentiation signal, square root signal). For example, in a case where n=1 (i.e., f(x)=x²) in the expression (1), the nonlinear operation section 21 squares the high-frequency signal S11, to generate the nonlinear signal S21. Assuming in this case that data sequences constituting the high-frequency signal S11 are X1, X2, X3, . . . , the nonlinear signal S21 obtained by squaring the high-frequency signal S11 becomes a digital signal constituted by data sequences X1², X2², and X3², . . . .

In a case where a signal value of the high-frequency signal S11 is any of integer values −255 through 255, 255 may be used to normalize x, in using the function f(x). For example, the expression (2) may be replaced with the following expression (4) obtained by using x/255 to normalize x on the right side of the function f(x) expressed as the expression (2) and multiplying the right side by 255. Note that the expression (4) meets the requirement of f(x)>x.

$$f(x)=255|x/255|^{1/2} \quad (4)$$

In the expression (4), 255 is used to normalize x on the right side of the function f(x) expressed as the expression (2) and the right side is multiplied by 255. However, a numerical value by which the right side is multiplied does not need to be identical to a value (255 in this example) to normalize x. It is only necessary that the numerical value meet the requirement of |f(x)|>|x|. For example, the following expression (5) in which the right side is multiplied by 100 instead of 255 may be replaced with the expression (4).

$$f(x)=100|x/255|^{1/2} \quad (5)$$

Further, the function f(x) may be expressed as the following expression (6), which uses a trigonometric function.

$$f(x)=255|\sin[(x/255)(\pi/2)]| \quad (6)$$

Subsequently, in accordance with sign bit information on the high-frequency signal S11, the sign changing section 41 generates, as a sign change signal S41, a signal obtained by reflecting a sign of the high-frequency signal S11 in the nonlinear signal S21. Namely, the sign changing section 41 retains a sign of a part of the nonlinear signal S21 which part is identical in sign to the high-frequency signal S11. In contrast, the sign changing section 41 reverses positive and negative signs of a part of the nonlinear signal S21 which part is different in sign from the high-frequency signal S11.

Then, the limiter 51 carries out a process (hereinafter also described as an amplitude adjustment process) for adjusting an amplitude (signal level, intensity) of the sign change signal S41 which is generated by the sign changing section 41, to generate a nonlinear process signal (first nonlinear process signal, second nonlinear process signal, third nonlinear process signal, fourth nonlinear process signal) S12. Specifically, the limiter 51 multiplies the sign change signal S41 by a specific magnification value α(|α|<1), so as to adjust the amplitude of the sign change signal S41.

It is desirable that the magnification value α is appropriately set according to motion of an image and an amount of noises. In a case where the magnification value α is a fixed value, it is desirable that the absolute value of the magnification value α is 0.5 or less for example.

In order not to further amplify a signal which has sufficient energy, the limiter 51 carries out a process (hereinafter also described as a clip process) for changing, to a value not more than a predetermined upper limit UV2, an absolute value of a part of the nonlinear process signal S12 which part has an absolute value higher than the upper limit UV2, so that a signal value of the nonlinear process signal S12 is not more than the upper limit UV2. For example, in a case where a part of the nonlinear process signal S12 has a signal value whose absolute value exceeds "64", the limiter 51 changes the signal value to "64" or "−64" in accordance with a sign of the part of the signal value. Alternatively, the limiter 51 changes the part of the signal value to "0".

Note that the nonlinear process section 102a may include no limiter 51 that carries out the amplitude adjustment process and the clip process on the sign change signal S41. In this case, the nonlinear process section 102a outputs, as the nonlinear process signal S12, the sign change signal S41 which is generated by the sign changing section 41.

Finally, the addition section 15 is to be described. The addition section 15 adds the nonlinear process signal S12 as a correction signal to the input signal Sin, so as to generate the output signal Sout. Note that the addition section 15 appropriately includes a delay element for adjusting timing between the input signal Sin and the nonlinear process signal S12.

(Waveform of Signal in Configuration Example 1)

The following description discusses waveforms of signals generated by sections of the sharpening process section 100a with reference to (a) through (e) of FIG. 5. (a) through (e) of FIG. 5 schematically illustrate waveforms of the signals generated by the sections of the sharpening process section 100a. It is assumed here that the sharpening process section 100a receives the signal shown in (a) of FIG. 5 as the input signal Sin.

Initially, when the input signal Sin is inputted to the high-frequency component extracting section 11, a high-frequency component included in the input signal Sin is extracted so that the high-frequency signal S11 shown in (b) of FIG. 5 is generated.

Next, in a case where the nonlinear operation carried out by the nonlinear operation section 21 of the nonlinear process section 102a is f(x)=x², the nonlinear operation section 21 generates the nonlinear signal S21 obtained by squaring the high-frequency signal S11 (see (c) of FIG. 5).

Subsequently, the sign changing section 41 which has received the nonlinear signal S21 generates the sign change signal S41 (see (d) of FIG. 5). As illustrated in (d) of FIG. 5, the sign change signal S41 retains positive and negative signs of the high-frequency signal S11 shown in (b) of FIG. 5.

Then, the limiter 51 which has received the sign change signal S41 carries out the amplitude adjustment process and the clip process, so as to generate the nonlinear process signal S12. Thereafter, the addition section 15 adds the nonlinear process signal S12 to the input signal Sin, so as to generate the output signal Sout (see (e) of FIG. 5).

Note that rising and falling of the signal of the nonlinear process signal S12 (see (e) of FIG. 5), which are steeper than those of a signal obtained by enhancing the input signal Sin by use of the linear operation, are to be described with reference to FIG. 6.

The signal shown in (a) of FIG. 6 is identical to the input signal Sin shown in (a) of FIG. 5. In order to enhance the input signal Sin shown in (a) of FIG. 6, a sharpening process using the linear operation uses a method in which a high-frequency signal is extracted from the input signal Sin shown in (a) of FIG. 6 and the input signal Sin is added to the high-frequency signal thus extracted. Therefore, a signal component which is not contained in the input signal Sin and exceeds the Nyquist frequency is not added in the conventional sharpening process using the linear operation.

Consequently, in the sharpening process based on linear operation, a signal shown in (b) of FIG. 6 is generated. Rising of the signal shown in (b) of FIG. 6 is sharper than rising of the input signal Sin shown in (a) of FIG. 6. However, rising of the non-liner process signal S12 ((e) of FIG. 5) generated by the sharpening process section 100a is further steeper.

(Configuration Example 2 of Sharpening Process Section)

The nonlinear process section 102a described above may differentiate the nonlinear signal S21 which is generated by the nonlinear operation section 21. This is because differentiation of the nonlinear signal S21 allows removal of a direct-current component contained in the nonlinear operation section 21.

Therefore, a configuration example of the sharpening process section 100b is to be described with reference to FIG. 7. FIG. 7 is a block diagram illustrating a configuration of the sharpening process section 100b.

As shown in FIG. 7, the sharpening process section 100b includes a high-frequency component extracting section 11, a nonlinear process section 102b, and an addition section 15. The nonlinear process section 102b includes not only the configuration of the nonlinear process section 102a shown in FIG. 2 but also a differentiation section (differentiation means) 31 between the nonlinear operation section 21 and the sign changing section 41. The high-frequency component extracting section 11, members other than the differentiation section 31 in the nonlinear process section 102b, and the addition section 15 are the same as those explained above and therefore detailed explanations thereof are omitted here.

The differentiation section 31 differentiates the nonlinear signal S21 generated by the nonlinear operation section 21, thereby generating a differentiation signal S31.

A configuration of the differentiation section 31 is to be described with reference to FIG. 8. FIG. 8 is a block diagram illustrating a configuration of the differentiation section 31. As shown in FIG. 8, the differentiation section 31 includes a unit delay element 3111 and a subtraction section 3112. The differentiation section 31 finds a backward difference with respect to a signal to be supplied to the differentiation section 31.

With respect to the differential signal S31 which has been generated by the differentiation section 31, in accordance with sign bit information on the high-frequency signal S11, the sign changing section 41 generates, as a sign change signal S42, a signal obtained by reflecting a sign of the high-frequency signal S11 in the nonlinear signal S21. Namely, the sign changing section 41 retains a sign of a part of the differential signal S31 which part is identical in sign to the high-frequency signal S11. In contrast, the sign changing section 41 reverses positive and negative signs of a part of the nonlinear signal S21 which part is different in sign from the high-frequency signal S11.

The limiter 51 carries out the amplitude adjustment process and the clip process with respect to the sign change signal S42 which is generated by the sign changing section 41, so as to generate the nonlinear process signal S12. According to the amplitude adjustment process, the sign change signal S42 is multiplied by a predetermined magnification value α, to adjust amplitude of the sign change signal S42.

Note that the nonlinear process section 102b may include no limiter 51 and not carry out the amplitude adjustment process and the clip process with respect to the sign change signal S42. In this case, the nonlinear process section 102b outputs, as the nonlinear process signal S12, the sign change signal S42 which is generated by the sign changing section 41.

(Waveform of Signal in Configuration Example 2)

The following explains waveforms of signals generated by sections of the sharpening process section 100b with reference to (a) through (f) of FIG. 9. (a) through (f) of FIG. 9 schematically show waveforms of signals generated by sections of the sharpening process section 100b. Here, it is assumed that a signal shown in (a) of FIG. 9 is inputted as the input signal Sin to the sharpening process section 100b. The signal shown in (a) of FIG. 9 is the same as the signal shown in (a) of FIG. 5.

Initially, when the input signal Sin is inputted to the high-frequency component extracting section 11, a high-frequency component included in the input signal Sin is extracted so that the high-frequency signal S11 shown in (b) of FIG. 9 is generated.

Subsequently, when nonlinear operation carried out by the nonlinear operation section 21 of the nonlinear process section 102b is based on $f(x)=x^2$, the nonlinear signal S21 obtained by squaring the high-frequency signal S11 is generated by the nonlinear operation section 21 (see (c) of FIG. 9).

Subsequently, when the nonlinear signal S21 is inputted to the differentiation section 31, the differentiation signal S31 shown in (d) of FIG. 9 is generated. It should be noted that the differentiation signal S31 does not include a direct current component which has been included in the nonlinear signal S21.

Subsequently, when the differentiation signal S31 is inputted into the sign changing section 41, the sign change signal S42 shown in (e) of FIG. 9 is generated. As shown in (e) of FIG. 9, the sign change signal S42 has the same positive and negative signs as those of the high-frequency signal S11 shown in (b) of FIG. 9.

Subsequently, when the sign change signal S41 is inputted to the limiter 51, the amplitude adjustment process and the clipping process are carried out, to generate the nonlinear process signal S12. Lastly, the addition section 15 adds the nonlinear process signal S12 to the input signal Sin, thereby generating the output signal Sout (see (f) of FIG. 9).

Rising and falling of the output signal Sout shown in (f) of FIG. 9 are steeper than those of a signal sharpened based on linear operation.

(Configuration Example 3 of Sharpening Process Section)

The nonlinear process section 102a and the nonlinear process section 102b explained above include the sign changing section 41. Alternatively, the nonlinear process section of the present invention may be arranged not to include the sign changing section 41 as long as the nonlinear operation carried out on the high-frequency signal S11 retains the positive and negative signs of the high-frequency signal S11.

With reference to FIG. 10, the following explains a configuration example of a sharpening process section 100c which does not include the sign changing section 41. FIG. 10 is a block diagram showing a configuration of the sharpening process section 100c.

As shown in FIG. 10, the sharpening process section 100c includes a high-frequency component extracting section 11, a nonlinear process section 102c, and an addition section 15. The nonlinear process section 102c includes a nonlinear operation section (odd exponentiation operation means) 22 and a limiter 51. The high-frequency component extracting section 11, the limiter 51, and the addition section 15 are the same as those explained above and detailed explanations thereof are omitted here.

The nonlinear operation section 22 carries out nonlinear operation on the high-frequency signal S11, thereby generating a nonlinear signal S22.

The nonlinear operation which is carried out by the nonlinear operation section 22 is described here. The following description denotes a signal value to be supplied to the nonlinear operation section 22 as x, denotes a signal value to be supplied from the nonlinear operation section 22 as y, and expresses the nonlinear operation which is carried out by the nonlinear operation section 22 as a function y=g(x).

Assume here that the function g(x) is a nonlinear monotone increasing function which monotonically increases so as to be in positive and negative symmetry (origin symmetry). Note that "monotone increasing" means broad monotone increasing. However, it is only necessary that the function g(x) monotonically increases at least in the vicinity of x="0". It is preferable that the function g(x) be |g(x)|>|x| at least in the vicinity of x="0".

Such a function g(x) is exemplified by that expressed as the following expression (7).

$$g(x)=x^{2n+1} \text{ (}n\text{ is a natural number)} \quad (7)$$

In a case where the expression (7) is used as the function g(x), the nonlinear operation section 22 raises the high-frequency signal S11 to an odd exponent not less than 3, so as to generate the nonlinear signal S22. For example, in a case where n=1 (i.e., $g(x)=x^3$) in the expression (7), the nonlinear operation section 22 cubes the high-frequency signal S11, so as to generate the nonlinear signal S22. Assuming in this case that data sequences constituting the high-frequency signal S11 are X1, X2, X3, ..., the nonlinear signal S22 obtained by cubing the high-frequency signal S11 becomes a digital signal constituted by data sequences $X1^3$, $X2^3$, and $X3^3$, ....

The limiter 51 carries out the amplitude adjustment process and the clip process to the nonlinear signal S22 generated by the nonlinear operation section 22, so as to generate the nonlinear process signal S12.

Note that the nonlinear process section 102c may include no limiter 51 that carries out the amplitude adjustment process and the clip process to the nonlinear signal S22. In this case, the nonlinear process section 102c outputs, as the nonlinear process signal S12, the nonlinear signal S22 which is generated by the nonlinear operation section 22.

(Waveform of Signal in Configuration Example 3)

The following explains waveforms of signals generated by sections of the sharpening process section 100c with reference to (a) through (d) of FIG. 11. (a) through (d) of FIG. 11 schematically show waveforms of the signals generated by sections of the sharpening process section 100c. Here, it is assumed that a signal shown in (a) of FIG. 11 is inputted to the sharpening process section 100c as the input signal Sin. The signal shown in (a) of FIG. 11 is the same as the signal shown in (a) of FIG. 5.

Initially, when the input signal Sin is inputted to the high-frequency component extracting section 11, a high-frequency component included in the input signal Sin is extracted so that the high-frequency signal S11 shown in (b) of FIG. 11 is generated.

Subsequently, when nonlinear operation carried out by the nonlinear operation section 22 is $f(x)=x^3$, the nonlinear signal S22 obtained by raising the high-frequency signal S11 to the power of three is generated by the nonlinear operation section 22 (see (c) of FIG. 11).

Subsequently, when the nonlinear signal S22 is inputted to the limiter 51, the amplitude regulating process and the clipping process are carried out, to generate the nonlinear process signal S12. Lastly, the addition section 15 adds the nonlinear process signal S12 to the input signal Sin, thereby generating the output signal Sout (see (d) of FIG. 11).

Rising and falling of the output signal Sout shown in (d) of FIG. 11 are steeper than those of a signal sharpened based on linear operation.

(Reason why Frequency Higher than Nyquist Frequency is Generated)

The following explains why the output signal Sout generated by the sharpening process section 100 includes a high-frequency component higher than Nyquist frequency fs/2, such as a harmonic component included in the input signal Sin.

Here, it is assumed that the input signal Sin is represented by a function F(x) where x represents time.

When a base angular frequency of the input signal Sin is ω, the function F(x) can be represented by formula (8) below which is a Fourier series.

$$F(x)=a_{-N}\cos(-N)\omega x+a_{-N+1}\cos(-N+1)\omega x+\ldots+a_{-1}\cos(-1)\omega x+a_0+a_1\cos\omega x+a_2\cos 2\omega x+\ldots+a_N\cos N\omega x+b_{-N}\sin(-N)\omega x+b_{-N+1}\sin(-N+1)\omega x+\ldots+b_{-1}\sin(-1)\omega x+b_1\sin\omega x+b_2\sin 2\omega x+\ldots+b_N\sin N\omega x \quad (8)$$

In the expression (8), N is a degree of a higher harmonic wave having a maximum frequency which does not exceed the Nyquist frequency fs/2 with respect to the sampling frequency fs. Namely, the following expression (9) is met.

$$N\omega/(2\pi)<fs/2\le(N+1)\omega/(2\pi) \quad (9)$$

Next, in a case where a signal of the input signal Sin expressed as the function F(x) other than a direct-current component $a_0$ is denoted as G(x), G(x) is expressed as the following expression (10).

$$G(x)=a_{-N}\cos(-N)\omega x+a_{-N+1}\cos(-N+1)\omega x+\ldots+a_{-1}\cos(-1)\omega x+a_1\cos\omega x+a_2\cos 2\omega x+\ldots+a_N\cos N\omega x+b_{-N}\sin(-N)\omega x+b_{-N+1}\sin(-N+1)\omega x+\ldots+b_{-1}\sin(-1)\omega x+b_1\sin\omega x+b_2\sin 2\omega x+\ldots+b_N\sin N\omega x \quad (10)$$

Here, the input signal Sin inputted into the sharpening process section 100 includes a signal G(x) or a high-frequency component of the signal G(x).

For example, in a case where the nonlinear operation section 21 carries out the nonlinear operation of $f(x)=x^2$, the nonlinear operation section 21 generates the nonlinear signal S21 by squaring the high-frequency signal S11. Note here that each term of $(G(x))^2$ is expressed as any of the following expressions (11) through (13) based on the expression (10) (i=±1, ±2, ..., ±N; j=±1, ±2, ±N).

$$a_i\cos i\omega x\cdot a_j\cos j\omega x \quad (11)$$

$$a_i\cos i\omega x\cdot b_j\sin j\omega x \quad (12)$$

$$b_i\sin i\omega x\cdot b_j\sin j\omega x \quad (13)$$

Note here that the expressions (11) through (13) can be rewritten to the following respective expressions (14) through (16) by use of trigonometric formulae.

$$(a_ia_j/2)\{\cos(i+j)\omega x+\cos(i-j)\omega x\} \quad (14)$$

$$(a_ib_j/2)\{\sin(i+j)\omega x-\sin(i-j)\omega x\} \quad (15)$$

$$(-b_ib_j/2)\{\cos(i+j)\omega x-\cos(i-j)\omega x\} \quad (16)$$

$(G(x))^2$ contains angular frequency components such as $(N+1)\omega$, $(N+2)\omega$, ..., and $2N\omega$ (see expressions (14) through (16) above).

Accordingly, $(G(x))^2$ contains a frequency component which is higher than the Nyquist frequency fs/2. Namely, the nonlinear signal S21 which is generated by the nonlinear operation section 21 contains a frequency component which is higher than the Nyquist frequency fs/2 such as a harmonic component having a frequency of $2N\omega/(2\pi)$.

Similarly, for example, in a case where the nonlinear operation section 22 carries out the nonlinear operation of $f(x)=x^3$, the nonlinear operation section 22 generates the nonlinear signal S22 by cubing the high-frequency signal S11. Note here that each term of $(G(x))^3$ is expressed as any of the following expressions (17) through (20) based on the expression (10) ($i=\pm1, \pm2, \pm N$; $j=\pm1, \pm2, \pm N$; $k=\pm1, \pm2, \pm N$).

$$a_i \cos i\omega x \cdot a_j \cos j\omega x \cdot a_k \cos k\omega x \quad (17)$$

$$a_i \cos i\omega x \cdot a_j \cos j\omega x \cdot b_k \sin k\omega x \quad (18)$$

$$a_i \cos i\omega x \cdot b_j \sin j\omega x \cdot b_k \sin k\omega x \quad (19)$$

$$b_i \sin i\omega x \cdot b_j \sin j\omega x \cdot b_k \sin k\omega x \quad (20)$$

Note here that, in a case where attention is paid to terms in which $i=j=k=N$ and which are expressed as the expressions (17) and (20), these terms can be rewritten in the following respective expressions (21) and (22) by use of trigonometric formulae.

$$(a_N \cos N\omega x)^3 = a_N^3 \{(3/4)\cos N\omega x + (1/4)\cos 3N\omega x\} \quad (21)$$

$$(b_N \sin N\omega x)^3 = b_N^3 \{(3/4)\sin N\omega x - (1/4)\sin 3N\omega x\} \quad (22)$$

Moreover, for example, in a case where attention is paid to terms in which $i=j=k=-N$ and which are expressed as the expressions (17) and (20), these terms can be rewritten in the following respective expressions (23) and (24) by use of trigonometric formulae.

$$\{a_N \cos(-N\omega x)\}^3 = a_N^3 \{(3/4)\cos(-N\omega x) + (1/4)\cos(-3N\omega x)\} \quad (23)$$

$$\{b_N \sin(-N\omega x)\}^3 = b_N^3 \{(3/4)\sin(-N\omega x) - (1/4)\sin(-3N\omega x)\} \quad (24)$$

$(G(x))^3$ contains a frequency component which is 3N times a base angular frequency $\omega$ and a frequency component which is −3N times the base angular frequency $\omega$ (see the expressions (21) through (24)). The expressions (21) through (24) show that, in a case where the other terms of $(G(x))^3$ are rewritten by use of trigonometric formulae, $(G(x))^3$ contains various frequency components which range from 3N times to −3N times the base angular frequency $\omega$.

Accordingly, $(G(x))^3$ contains a frequency component which is higher than the Nyquist frequency fs/2. Namely, the nonlinear signal S22 which is generated by the nonlinear operation section 22 contains a frequency component which is higher than the Nyquist frequency fs/2 such as a harmonic component having a frequency of $3N\omega/(2\pi)$.

As described above, the output signal Sout generated by the sharpening process section 100 includes a high frequency component which is not included in the input signal Sin, i.e. a frequency component whose frequencies are higher than the Nyquist frequency.

(Another Configuration Example 1 of Sharpening Process Section)

There are many kinds of nonlinear operations carried out by the sharpening process section 100 other than those explained above. With reference to FIGS. 12 and 13, the following explains configuration examples of a sharpening process section 100d and a sharpening process section 100e.

Initially, FIG. 12 is a block diagram showing a configuration of the sharpening process section 100d. As shown in FIG. 12, the sharpening process section 100d includes a high frequency component extracting section 11, a nonlinear process section 102d, and an addition section 15. The high-frequency component extracting section 11 and the addition section 15 are the same as those explained above and thus detailed explanations thereof are omitted here.

The nonlinear process section 102d includes a square operation section 61, a first differentiation section 71, a second differentiation section 81, and a multiplication section 91.

The square operation section 61 squares the high-frequency signal S11, thereby generating a square signal S61. That is, when data sequences constituting the high-frequency signal S11 are X1, X2, X3, ..., the square signal S61 obtained by squaring the high-frequency signal S11 is a digital signal constituted by data sequences $X1^2$, $X2^2$, $X3^2$, ....

Subsequently, the first differentiation section 71 differentiates the square signal S61 generated by the square operation section 61, thereby generating a first differentiation signal S71. The configuration of the first differentiation section 71 is the same as that of the differentiation section 31 for example.

Subsequently, the second differentiation section 81 differentiates the input signal Sin, thereby generating a second differentiation signal S81. The configuration of the second differentiation section 81 is the same as that of the differentiation section 31 for example.

Subsequently, the multiplication section 91 multiplies the first differentiation signal S71 by the second differentiation signal S81, thereby generating a nonlinear process signal S12. That is, when data sequences constituting the first differentiation signal S71 are U1, U2, U3, ... and data sequences constituting the second differentiation signal S81 are V1, V2, V3, ..., the nonlinear process signal S12 is a digital signal constituted by data sequences U1·V1, U2·V2, U3·V3, ....

In the configuration explained above, there is provided the square operation section 61 in order to carry out nonlinear operation. Alternatively, there may be used a fourth power operation section which raises the high-frequency signal S11 to the fourth power. More generally, there may be used an exponentiation operation section which generates a signal obtained by raising the high-frequency signal S11 to an even exponent not less than 2.

(Another Configuration Example 2 of Sharpening Process Section)

The sharpening process section 100d explained above includes the square operation section 61. Alternatively, the sharpening process section may include, instead of the square operation section 61, an absolute value process section 62 which calculates the absolute value of an input signal.

Accordingly, with reference to FIG. 13, the following explains a sharpening process section 100e including the absolute value process section 62. FIG. 13 is a block diagram showing a configuration of the sharpening process section 100e.

As shown in FIG. 13, the sharpening process section 100e includes a high frequency component extracting section 11, a nonlinear process section 102e, and an addition section 15. The high-frequency component extracting section and the addition section 15 are the same as those explained above, and so detailed explanations thereof are omitted here.

The nonlinear process section 102e includes the absolute value process section 62, a first differentiation section 71, a second differentiation section 81, and a multiplication section 91. The first differentiation section 71, the second differentiation section 81, and the multiplication section 91 are the same as those explained above, and so detailed explanations thereof are omitted here.

The absolute value process section 62 generates an absolute value signal S62 which is a signal whose values correspond to absolute values of the high-frequency signal S11. That is, when data sequences constituting the high-frequency signal S11 are X1, X2, X3, . . . , the absolute value signal S62 is a digital signal constituted by data sequences |X1|, |X2|, |X3|, . . . .

Subsequently, the first differentiation section 71 differentiates the absolute value signal S62 generated by the absolute value process section 62, thereby generating a first differentiation signal S72.

Subsequently, the multiplication section 91 multiplies the first differentiation signal S72 by the second differentiation signal S81, thereby generating a nonlinear process signal S12.

(Configuration Example of Motion Detection Section)

With reference to FIG. 14, the following explains a configuration of the motion detection section 200. It should be noted that the configuration shown in FIG. 14 is merely a preferable example and the configuration of the motion detection section 200 is not limited to this.

In the configuration shown in FIG. 14, the motion detection section 200 includes at least a frame memory section 210, a difference calculation section (difference calculation means) 220, a first edge detection section (first high frequency component calculation means) 230, a second edge detection section (second high frequency component calculation means) 240, an edge calculation section (third high frequency component calculation means) 250, and a division section (division means) 260. The motion detection section 200 may further include a limiter 270 as shown in the drawing.

The frame memory section 210 retains an input signal with respect to each frame, and outputs the retained signal to the difference calculation section 220 with respect to each frame. Consequently, the signal outputted from the frame memory section 210 indicates a frame immediately before the current frame. The signal outputted from the frame memory section 210 is referred to as a memory signal S210.

The difference calculation section 220 calculates a frame difference between a frame (current frame) indicated by the signal inputted to the motion detection section 200 and a frame which is indicated by the memory signal S210 and which is immediately before the current frame. The signal outputted from the difference calculation section 220 is referred to as a difference signal S220.

The first edge detection section 230 detects, with respect to each block region, a high frequency component (edge component) included in the immediately-before frame indicated by the memory signal S210. The first edge detection section 230 outputs the detected high frequency component as a first edge signal S230 (first high frequency component).

The second edge detection section 240 detects, with respect to each block region, a high frequency component (edge component) included in the current frame. The second edge detection section 240 outputs the detected high frequency component as a second edge signal S240 (second high frequency component).

The first edge detection section 230 and the second edge detection section 240 can be realized by a high pass filter etc. that allows a high frequency component to pass.

The edge calculation section 250 receives the first edge signal S230 and the second edge signal S240 and carries out predetermined calculation on the first edge signal S230 and the second edge signal S240 with respect to each block region, thereby obtaining an edge signal S250 (third high frequency component). Examples of the predetermined calculation include (A)-(D) below. The most preferable calculation is (A) below.

(A) At individual positions in the block region, one of the signal value of the first edge signal S230 and the signal value of the second edge signal S240 which one has a larger absolute value is regarded as a signal value of the edge signal S250 while retaining plus and minus signs thereof.

(B) At individual positions in the block region, a sum of a signal value of the first edge signal S230 and a signal value of the second edge signal S240 is regarded as a signal value of the edge signal S250.

(C) At individual positions in the block region, an average of a signal value of the first edge signal S230 and a signal value of the second edge signal S240 is regarded as a signal value of the edge signal S250.

(D) At individual positions in the block region, a weighted average of a signal value of the first edge signal S230 and a signal value of the second edge signal S240 is regarded as a signal value of the edge signal S250. That is, the signal value of S250 is {(signal value of S230×$\gamma$+signal value of S240×$\epsilon$)/($\gamma$+$\epsilon$)} where $\gamma$ and $\epsilon$ are any positive integers indicative of weight.

In other words, each of the calculations (A)-(D) is addition of a product of the signal value of the first edge signal S230 and a first coefficient (hereinafter coefficient P1) and a product of the signal value of the second edge signal S240 and a second coefficient (hereinafter coefficient P2) to calculate the signal value of the edge signal S250.

Specifically, the calculation (A) is an addition of the first edge signal S230×P1 and the second edge signal S240×P2 to calculate the edge signal S250 where P1=1 and P2=0 in a case the absolute value of the signal value of the first edge signal S230 is not less than the absolute value of the signal value of the second edge signal S240 and where P1=0 and P2=1 in a case the absolute value of the signal value of the first edge signal S230 is less than the absolute value of the signal value of the second edge signal S240.

The calculation (B) is an addition of the first edge signal S230×P1 and the second edge signal S240×P2 to calculate the edge signal S250 where P1=1 and P2=1.

The calculation (C) is an addition of the first edge signal S230×P1 and the second edge signal S240×P2 to calculate the edge signal S250 where P1=0.5 and P2=0.5.

The calculation (D) is an addition of the first edge signal S230×P1 and the second edge signal S240×P2 to calculate the edge signal S250 where P1={$\gamma$/($\gamma$+$\epsilon$)} and P2={$\epsilon$/($\gamma$+$\epsilon$)}.

P1 and P2 are set by the edge calculation section 250 depending on which of the calculations (A)-(D) is employed.

It should be noted that since the edge signal S250 is used in division carried out by the division section 260, a predetermined value (e.g. "10") is always added to the calculated edge signal S250 for preventing division by zero.

The division section 260 divides the difference signal S220 by the edge signal S250 with respect to each block region. In other words, the difference signal S220 is normalized by the edge signal S250. Thus, a motion signal S260 indicative of a motion amount per block region is outputted. The reason why the motion amount can be calculated by dividing the frame difference by the edge component will be mentioned later. As the signal value of the motion signal S260 is larger, the motion amount is larger.

The limiter 270 changes a portion of the motion signal S260 which portion has smaller absolute value than a threshold TH to "0" (motionless). That is, the limiter 270 regards a block region whose motion amount has a smaller absolute value than the threshold TH as motionless (regards that no motion is detected in the block region). In other words, the limiter 270 regards that only a block region whose motion amount has not a smaller absolute value than the threshold TH exhibits motion (regards that motion is detected in the block region). The threshold TH may be set appropriately. In particular, the threshold TH is preferably set depending on which calculation is carried out by the edge calculation section 250.

(Reason why Motion Amount can be Calculated by Dividing Frame Difference by Edge Component)

As described above, the motion detection section 200 having the configuration shown in FIG. 14 divides the difference signal S220 by the edge signal S250. The following explains the reason why the motion signal S260 obtained by the division indicates a motion amount.

Initially, assume that a predetermined object at a position x of the screen during the M-th frame constituting a moving image moves by a distance a in a main scanning direction of the screen. M is any integer and the position x is any coordinate position on the screen. When a pixel value at the position x on the screen during the M-th frame is expressed as a function $P_M(x)$, a relation represented by an expression (25) below is met.

$$P_M(x) = P_{M+1}(x+a) \quad (25)$$

The right side member of the expression (25) can be developed into an expression (26) below by Taylor expansion.

$$P_{M+1}(x+a) = P_{M+1}(x) + \frac{a}{1!}P'_{M+1}(x) + \frac{a^2}{2!}P''_{M+1}(x) + \ldots \quad (26)$$
$$\approx P_{M+1}(x) + a \cdot P'_{M+1}(x)$$

Subsequently, $P_{M+1}(x)$ is subtracted from both side members of the expression (26) so that an expression (27) below is obtained.

$$P_{M+1}(x+a) - P_{M+1}(x) = a \cdot P'_{M+1}(x) \quad (27)$$

Subsequently, the expression (25) is assigned to the left side member of the expression (27) so that an expression (28) below is obtained.

$$P_M(x) - P_{M+1}(x) = a \cdot P'_{M+1}(x) \quad (28)$$

Subsequently, both side members of the expression (28) are divided by $P_{M+1}'(x)$ so that an expression (29) below is obtained.

$$\frac{P_M(x) - P_{M+1}(x)}{P'_{M+1}(x)} = a \quad (29)$$

Here, since $P_{M+1}'(x)$ indicates an edge of the position x in the M+1-th frame, the left side member of the expression (29) is a division of "difference in pixel value at position x between M-th frame and M+1-th frame" by "edge at position x in M+1-th frame". On the other hand, the right side member of the expression (29) is a distance a indicative of a motion amount.

Therefore, by dividing the frame difference by the edge component, it is possible to calculate the motion amount. Since the frame difference is normalized by division by the edge component, it is possible to calculate the motion amount regardless of the amount of the frame difference.

(Reason why Two Edge Components are Used in Calculation)

As described above, in the motion detection section 200 having the configuration shown in FIG. 14, the first edge detection section 230 detects an edge component in the M+1-th frame and the second edge detection section 240 detects an edge component in the M-th frame. Then, the edge calculation section 250 calculates the edge signal S250 by using the signal values of the first edge signal S230 and the second edge signal S240. Thereafter, the division section 260 divides the difference signal S220 by the edge signal S250.

With reference to FIG. 15, the following explains why the frame difference is divided by the edge signal S250 which is calculated from the edge components in the M-th frame and the M+1-th frame.

(a) of FIG. 15 is a schematic view showing a waveform of a signal in the M-th frame. (b) of FIG. 15 is a schematic view showing a waveform of a signal in the M+1-th frame. It is assumed that a predetermined object moves at a constant speed in a screen without changing its shape from the M-th frame shown in (a) of FIG. 15 to the M+1-th frame shown in (b) of FIG. 15. (c) of FIG. 15 is a schematic view showing a difference (frame difference) between the signal shown in (a) of FIG. 15 and the signal shown in (b) of FIG. 15.

Here, when the frame difference shown in (c) of FIG. 15 is divided by only the edge component in the M+1-th frame, the waveform shown in (d) of FIG. 15 is obtained for example. In this case, in the signal whose frame difference is shown in (c) of FIG. 15, a portion resulting from the signal during the M+1-th frame (signal in a zone from B to C in the drawing) has s smaller signal value by the division, whereas a portion resulting from the signal during the M-th frame (signal in a zone from A to B in the drawing) does not have a smaller signal value by the division because the portion does not have an edge component of the frame during the M+1-th frame. Consequently, as a result of the division, there exist both the portion with a large signal value and the portion with a small signal value in the motion signal S260 obtained by the division, as shown in (d) of FIG. 15. That is, although an identical predetermined object moves, there may appear a difference between the portion with a large signal value and the portion with a small signal value in a signal indicative of the frame difference.

However, the motion amount of a predetermined object in the M-th frame is equal to the motion amount of the predetermined object in the M+1-th frame. Accordingly, unless in regard to a motion signal S260, a portion resulting from the signal in the M-th frame has substantially the same shape as a portion resulting from the signal in the M+1-th frame, it is impossible to correctly detect the motion region.

In order to deal with this problem, the frame difference shown in (c) of FIG. 15 is divided not by the edge component in the M+1-th frame only, but by the edge signal S250 calculated from the edge component in the M-th frame and the edge component in the M+1-th frame.

How to calculate the edge signal S250 has been already described above. In particular, it is preferable that one of the signal value of the first edge signal S230 and the signal value of the second edge signal S240 which one has a larger absolute value is regarded as the signal value of the edge signal S250 while retaining positive and negative signs thereof.

By dividing the frame difference shown in (c) of FIG. 15 by the edge signal S250 thus calculated, a waveform shown in (e) of FIG. 15 for example is obtained. Consequently, in the motion signal S260, the portion resulting from the signal in the M-th frame and the portion resulting from the signal in the M+1-th frame can be substantially identical with each other.

In this case, the motion signal S260 can have an identical level or similar levels regardless of the luminance level of the predetermined object.

It should be noted that merely calculating the frame difference does not allow correct detection of a motion region. This is explained below using a case where luminance data of an image is an 8-bit digital signal as an example. In this case, a luminance value is between 0 and 255. Here, a case where an object with a luminance value of "10" moves by 5 pixels per frame and a case where an object with a luminance value of "100" moves by 5 pixels per frame exhibit different frame differences but exhibit an identical motion amount of 5 pixels per frame. However, when the frame difference is simply regarded as a motion amount, the case where the object with a larger luminance value exhibits a larger motion signal. That is, the motion amount of the object with a luminance value of "100" is 10 times larger than the motion amount of the object with a luminance value of "10".

Application Examples

Sharpening Process in Main Scanning Direction, Sub Scanning Direction, and Temporal Direction Normally, the sharpening process on a moving image is carried out in a main scanning direction (lateral direction, horizontal direction) and a sub scanning direction (longitudinal direction, vertical direction). Furthermore, carrying out the sharpening process also in the temporal direction allows further sharpening the moving image. It should be noted that sharpening in the temporal direction allows prevention of an afterimage.

Each of the unit delay elements 111h included in the high frequency component extracting section 11 of the sharpening process section 100 may be (1) one which outputs a signal delayed by a unit time in a main scanning direction of a moving image indicated by an input signal, or (2) one which outputs a signal delayed by a unit time in a sub scanning direction of a moving image indicated by an input signal, or (3) one which outputs a signal delayed by a unit time (per each frame) in a temporal direction of a moving image indicated by an input signal.

In a case where each of the unit delay elements 111h is one having the configuration (1), the sharpening process section 100 can carry out the sharpening process in a main scanning direction of a moving image. The sharpening process in the main scanning direction is hereinafter referred to as a main scanning direction process.

In a case where each of the unit delay elements 111h is one having the configuration (2), the sharpening process section 100 can carry out the sharpening process in a sub scanning direction of a moving image. The sharpening process in the sub scanning direction is hereinafter referred to as a sub scanning direction process.

In a case where each of the unit delay elements 111h is one having the configuration (3), the sharpening process section 100 can carry out the sharpening process in a temporal direction of a moving image. The sharpening process in the temporal direction is hereinafter referred to as a temporal direction process.

Therefore, in a case of carrying out the sharpening process on a motion region of a moving image indicated by the input signal SA, the configuration shown in FIG. 16 is most preferable. FIG. 16 is a block diagram showing a signal processing device 500b which carries out the main scanning direction process, the sub scanning direction process, and the temporal direction process on a motion region of a moving image.

As shown in FIG. 16, the signal processing device 500b includes a sharpening process section 100 which carries out the main scanning direction process, a sharpening process section 100 which carries out the sub scanning direction process, and a sharpening process section 100 which carries out the temporal direction process. A signal from the sharpening process section 100 which carries out the main scanning direction process (first sharpening signal) is inputted to the sharpening process section 100 which carries out the sub scanning direction process. A signal from the sharpening process section 100 which carries out the sub scanning direction process (second sharpening signal) is inputted to the sharpening process section 100 which carries out the temporal direction process. The sharpening process section 100 which carries out the temporal direction process outputs a signal to the connection point In1.

Accordingly, when the motion detection section 200 detects motion, the connection point Out is connected with the connection point In1 so that a signal from the sharpening process section 100 which carries out the temporal direction process (motion region signal) is outputted as an output signal SO from the signal output section 300. On the other hand, when the motion detection section 200 does not detect motion, the connection point Out is connected with the connection point In2 so that a signal from the delay process section 400 (non-motion region signal) is outputted as an output signal SO from the signal output section 300.

In the signal processing device 500b, the first edge detection section 230 and the second edge detection section 240 included in the motion detection section 200 operate as follows.

The first edge detection section 230 detects, with respect to each block region, a larger one of a high frequency component in a main scanning direction and a high frequency component in a sub scanning direction in a previous frame indicated by the memory signal S210, and outputs the detected high frequency component as the first edge signal S230. Alternatively, a signal obtained by adding the high frequency component in the main scanning direction and the high frequency component in the sub scanning direction may be outputted as the first edge signal S230.

Similarly, the second edge detection section 240 detects, with respect to each block region, a larger one of a high frequency component in a main scanning direction and a high frequency component in a sub scanning direction in a latest frame, and outputs the detected high frequency component as the second edge signal S240. Alternatively, a signal obtained by adding the high frequency component in the main scanning direction and the high frequency component in the sub scanning direction may be outputted as the second edge signal S240.

Since the configuration of the signal processing device 500b allows carrying out the main scanning direction process, the sub scanning direction process, and the temporal direction process with respect to a motion region, it is possible to highly sharpen the motion region.

In FIG. 16, the signal processing device 500b includes the sharpening process section 100 which carries out the main scanning direction process, the sharpening process section 100 which carries out the sub scanning direction process, and the sharpening process section 100 which carries out the temporal direction process. Alternatively, for the purpose of cost reduction and/or increase in processing speed, a part of the sharpening process sections 100 may be omitted. For example, the sharpening process section 100 which carries out the temporal direction process may be omitted from the configuration shown in FIG. 16 so that the signal processing device 500b includes only the sharpening process section 100 which carries out the main scanning direction process and the sharpening process section 100 which carries out the sub scanning direction process.

Modification Example

Sharpening in Accordance with Motion Amount

In a case where the motion detection section 200 is designed to calculate a motion amount with respect to each block region as shown in FIG. 14, the motion detection section 200 may be arranged to inform the sharpening process section 100 of the calculated motion amount so that the degree of sharpening each block region is changed in accordance with the motion amount. The following explains two examples of such a configuration.

First example of such a configuration is that the limiter 51 included in the sharpening process section 100 sets a magnification value α by which the sign change signal S41 is multiplied to a value in accordance with a motion amount calculated by the motion detection section 200. That is, the magnification value α is set to be larger as the motion amount is larger.

For example, in a case where the absolute value of a motion amount can be between 0 and 7, when the absolute value of a motion amount is between 1 and 3 (when the motion amount is small), the magnification value α is set to 0.2, and when the absolute value of a motion amount is between 4 and 7 (when the motion amount is large), the magnification value α is set to 0.8.

By setting the magnification value α as above, the amplitude of the sign change signal S41 is large when the motion amount is large, and consequently the amplitude of the nonlinear process signal S12 is large. Therefore, a block region with a large motion amount is sharpened to a higher degree than a block region with a small motion amount.

The following explains second example of the aforementioned configuration. The second example is that the high frequency component extracting section 11 has a plurality of filters 110 having different combinations of coefficients Ck (i.e. a plurality of filters 110 having different frequency characteristics) and the filter 110 in accordance with the motion amount calculated by the motion detection section 200 is selected and used.

The plurality of filters 110 having different coefficients Ck include, for example, one with the coefficients Ck set to allow a larger amount of frequency components to pass, and one with the coefficients Ck set to allow a smaller amount of frequency components to pass.

For example, in a case where the absolute value of a motion amount can be between 0 and 7, when the absolute value of a motion amount is between 1 and 3 (when the motion amount is small), the filter 110 with the coefficients Ck set to allow a smaller amount of frequency components to pass is selected, and when the absolute value of a motion amount is between 4 and 7 (when the motion amount is large), the filter 110 with the coefficients Ck set to allow a larger amount of frequency components to pass is selected. Consequently, when the motion amount is large, the high band signal SH1 is large, so that the amplitude of the nonlinear process signal S12 is large. Therefore, a block region with a large motion amount is sharpened to a higher degree than a block region with a small motion amount.

Second Embodiment

The signal processing device 500 described in First Embodiment is a device for carrying out the sharpening process with respect to a motion region of a moving image indicated by the input signal SA. Alternatively, the signal processing device may be arranged to carry out the sharpening process with respect to a still region of a moving image as well as a motion region of the moving image. By carrying out the sharpening process with respect to a still region of a moving image as well as a motion region of the moving image, it is possible to give feeling that resolution of the moving image is further increased. Normally, a still region has less blur than a motion region, and accordingly it is desirable that the still region is sharpened to less extent than the motion region is.

In the present embodiment, an explanation is made as to a case where a still region as well as a motion region is sharpened. "Still region" in the specification indicates a region where motion is not observed between frames. The "still region" may be only a region in a stationary state, or may include a region where minor motion is observed (motion amount is less than a predetermined threshold).

The following explains one embodiment of the present invention with reference to FIGS. 17 and 18. The signal processing device 500 in accordance with the present embodiment is referred to as a signal processing device 500c. For convenience of explanation, members having the same functions as those explained in First Embodiment are given the same reference signs and explanations thereof are omitted unless described specifically.

In the explanation of the signal processing device 500c, the direction in which the sharpening process is carried out (main scanning direction, sub scanning direction, temporal direction) is not particularly mentioned.

(Configuration of Signal Processing Device)

With reference to FIG. 17, an explanation is made as to the configuration of the signal processing device 500c. FIG. 17 is a block diagram showing the configuration of the signal processing device 500c. As shown in the drawing, the signal processing device 500c includes two sharpening process sections 100, a motion detection section 200, and a signal output section 300.

Here, out of the two sharpening process sections 100, the sharpening process section 100 for carrying out the sharpening process with respect to a motion region is particularly referred to as a "sharpening process section 100A", and the sharpening process section 100 for carrying out the sharpening process with respect to a still region is particularly referred to as a "sharpening process section 100B".

The sharpening process section 100A receives an input signal SA and outputs a signal to the connection point In1. The sharpening process section 100B receives an input signal SA and outputs a signal to the connection point In2.

The sharpening process section 100A and the sharpening process section 100B have the same configuration as the sharpening process section 100 described above. However, the sharpening process section 100A and the sharpening process section 100B are arranged to have at least one of configurations (1) and (2) below, and so carry out sharpening to different extents.

(1) A magnification value α by which the limiter 51 of the sharpening process section 100A multiplies the sign change signal S41 (hereinafter α1) is set to be larger than a magnification value α by which the limiter 51 of the sharpening process section 100B multiplies the sign change signal S41 (hereinafter α2). α1 is preferably approximately three times larger than α2.

Consequently, the amplitude of the sign change signal S41 is larger in a motion region than in a still region, so that the amplitude of the nonlinear process signal S12 is larger in the motion region than in the still region. Therefore, the motion region is sharpened to higher extent than the still region.

(2) The coefficients Ck for the filter 110 of the sharpening process section 100A are set to allow a larger amount of frequency components to pass, and the coefficients Ck for the filter 110 of the sharpening process section 100B are set to allow a smaller amount of frequency components to pass.

Consequently, the amplitude of the high band signal SH1 is larger in a motion region than in a still region, so that the amplitude of the nonlinear process signal S12 is larger in the motion region than in the still region. Therefore, the motion region is sharpened to higher extent than the still region.

Consequently, in the signal processing device 500c, with respect to a block region from which motion has been detected by the motion detection section 200, an output signal Sout from the sharpening process section 100A is outputted as an output signal SO. On the other hand, with respect to a block region from which motion has not been detected by the motion detection section 200, an output signal Sout from the sharpening process section 100B is outputted as an output signal SO.

Application Examples

Sharpening Process in Main Scanning Direction, Sub Scanning Direction, and Temporal Direction Also in the present embodiment, the configuration in which both of a motion region and a still region are subjected to the main scanning direction process, the sub scanning direction process, and the temporal direction process is most appropriate.

FIG. 18 is a block diagram showing a signal processing device 500d which carries out the main scanning direction process, the sub scanning direction process, and the temporal direction process with respect to each of a motion region and a still region of a moving image.

As shown in FIG. 18, the signal processing device 500d includes a sharpening process section 100A which carries out the main scanning direction process, a sharpening process section 100A which carries out the sub scanning direction process, and a sharpening process section 100A which carries out the temporal direction process, and a sharpening process section 100B which carries out the main scanning direction process, a sharpening process section 100B which carries out the sub scanning direction process, and a sharpening process section 100B which carries out the temporal direction process.

With the configuration of the signal processing device 500c, it is possible to carry out the main scanning direction process, the sub scanning direction process, and the temporal direction process with respect to each of a motion region and a still region. Accordingly, both of the motion region and the still region can be sharpened to high extent.

In FIG. 18, the signal processing device 500d includes the sharpening process section 100 which carries out the main scanning direction process, the sharpening process section 100 which carries out the sub scanning direction process, and the sharpening process section 100 which carries out the temporal direction process. Alternatively, for the purpose of cost reduction and/or increase in processing speed, a part of the sharpening process sections 100 may be omitted. For example, the sharpening process section 100 which carries out the temporal direction process may be omitted from the configuration shown in FIG. 18 so that the signal processing device 500d includes only the sharpening process section 100 which carries out the main scanning direction process and the sharpening process section 100 which carries out the sub scanning direction process.

Modification Example

Sharpening in Accordance with Motion Amount

Also in the present embodiment, the degree of sharpening a motion region can be changed in accordance with the motion amount. This configuration is the same as that described in First Embodiment and therefore an explanation thereof is omitted here.

(Additional Note)

Finally, the blocks of the signal processing device 500 may be realized by hardware by using a logic circuit on an integrated circuit (IC chip) or by software by using CPUs (central processing unit) as follows.

In a case of realizing by software, the signal processing device 500 (sharpening process section 100 in particular) includes: CPUs for executing a control program for realizing each function; ROMs (read only memory) that store the program; RAMs (random access memory) that develop the program; storage devices (storage mediums) such as memories that store the program and various data; and the like. The object of the present invention can be realized in such a manner that the signal processing device 500 is provided with a computer-readable storage medium for storing program codes (such as executable program, intermediate code program, and source program) of control programs of the signal processing device 500 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM, or logic circuits such as PLD (Programmable logic device).

Further, the signal processing device 500 may be arranged so as to be connectable to a communication network so that the program code is supplied to the signal processing device 500 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR (High Data Rate), NFC (Near Field Communication), DLNA (Digital Living Network Alliance), mobile phone network, satellite connections, and terrestrial digital network.

As described above, in the present specification, means does not necessarily indicate physical means, and includes a case where the functions of individual means are realized by software. Furthermore, the function of one means may be realized by two or more physical means, or the functions of two or more means may be realized by one physical means.

As described above, the signal processing device of the present invention is a signal processing device that subjects a signal indicative of a moving image constituted by a plurality of temporarily consecutive frames to a sharpening process for the moving image, to output a signal indicative of a moving image thus sharpened, the signal processing device including: motion detection means for detecting motion between the frames with respect to each block region consisting of one or a plurality of adjacent pixels constituting each of the frames; first high-frequency component generation means for generating a harmonic having been produced by sharpening a signal indicative of a moving image of the block region from which the motion has been detected by the motion detection means; and signal output means for outputting, with respect to the block region from which the motion has been detected by the motion detection means, the harmonic having been produced by sharpening a motion region signal that is a signal indicative of a moving image of the block region, while outputting, with respect to the block region from which the motion has not been detected by the motion detection means, a non-motion region signal that is a signal indicative of a moving image of the block region, the first high-frequency component generation means including: first low-frequency component removing means for removing, from frequency components of the motion region signal, at least a direct current component, to generate and output a first low-frequency-free signal; first nonlinear process means for receiving the first low-frequency-free signal, generating a first nonlinear process signal (i) in which positive and negative signs of the first low-frequency-free signal are retained and (ii) which broadly monotonically increases nonlinearly with respect to the first low-frequency-free signal when values of the first low-frequency-free signal are at least in the vicinity of 0, and outputting the first nonlinear process signal; and addition means for adding the first nonlinear process signal to the motion region signal, to generate the harmonic.

Furthermore, the integrated circuit of the present invention is an integrated circuit that subjects a signal indicative of a moving image constituted by a plurality of temporarily consecutive frames to a sharpening process for the moving image, to output a signal indicative of a moving image thus sharpened, the integrated circuit including: a motion detection circuit that detects motion between the frames with respect to each block region consisting of one or a plurality of adjacent pixels constituting each of the frames; a high-frequency component generation circuit that generates a harmonic having been produced by sharpening a signal indicative of a moving image of the block region from which the motion has been detected by the motion detection circuit; a signal output circuit that outputs, with respect to the block region from which the motion has been detected by the motion detection circuit, the harmonic having been produced by sharpening a motion region signal that is a signal indicative of a moving image of the block region, while outputting, with respect to the block region from which the motion has not been detected by the motion detection circuit, a non-motion region signal that is a signal indicative of a moving image of the block region, the high-frequency component generation circuit including: a low-frequency component removing circuit that removes, from frequency components of the motion region signal, at least a direct current component, to generate a low-frequency-free signal; a nonlinear process circuit that receives the low-frequency-free signal, generates a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0, and outputs the nonlinear process signal; and an addition circuit that adds the nonlinear process signal to the motion region signal, to generate the harmonic.

Consequently, it is possible to output a signal obtained by carrying out a nonlinear process with respect to the motion region signal indicative of an image of the motion region of a moving image.

Accordingly, it is possible to steepen rising and falling of a signal corresponding to an edge portion included in a motion region signal indicative of an image of a motion region. In particular, it is possible to further steepen rising and falling of a signal corresponding to the edge portion compared with a conventional sharpening process employing linear operation.

As a result, the signal processing device and the integrated circuit of the present invention can highly sharpen an image of a motion region, so that the signal processing device and the integrated circuit of the present invention can greatly reduce motion image blur in the motion region of a moving image, thereby improving image quality and giving feeling that resolution is increased.

Furthermore, a signal processing device of the present invention is a signal processing device that subjects a signal indicative of a moving image constituted by a plurality of temporarily consecutive frames to a sharpening process for the moving image, to output a signal indicative of a moving image thus sharpened, the signal processing device comprising: motion detection means for detecting motion between the frames with respect to each block region consisting of one or a plurality of adjacent pixels constituting each of the frames; first high-frequency component generation means for generating a first sharpening signal by sharpening a signal indicative of a pixel group consisting of pixels positioned adjacently in a main scanning direction of a moving image of the block region from which the motion has been detected by the motion detection means; second high-frequency component generation means for generating a second sharpening signal by sharpening a signal indicative of a pixel group consisting of pixels positioned adjacently in a sub-scanning direction of the moving image represented by the first sharpening signal; and signal output means for outputting, with respect to the block region from which the motion has been detected by the motion detection means, the second sharpening signal having been produced by sharpening a motion region signal that is a signal indicative of a moving image of the block region, while outputting, with respect to the block region from which the motion has not been detected by the motion detection means, a non-motion region signal that is a signal indicative of a moving image of the block region, the first high-frequency component generation means including: first low-frequency component removing means for removing, from frequency components of a main scanning direction signal that is a signal indicative of a pixel group consisting of pixels positioned adjacently in a main scanning direction of a moving image of the block region from which the motion has been detected by the motion detection means, at least a direct current component, to generate and output a first low-frequency-free signal; first nonlinear process means for generating a first nonlinear process signal (i) in which positive and negative signs of the first low-frequency-free signal are retained and (ii) which broadly monotonically increases nonlinearly with respect to the first low-frequency-free signal when values of the first low-frequency-free signal are at least in the vicinity of 0; and first addition means for adding the first nonlinear process signal to the main scanning direction signal, to generate the first sharpening signal, the second high-frequency component generation means including: second low-frequency component removing means for removing, from frequency components of a sub-scanning direction signal that is a signal indicative of a pixel group consisting of pixels positioned adjacently in a sub-scanning direction of a moving image represented by the first sharpening signal, at least a direct current component, to generate a second low-frequency-free signal; second nonlinear process means for generating and outputting a second nonlinear process signal (i) in which positive and negative signs of the second low-frequency-free signal are retained and (ii) which broadly monotonically increases nonlinearly with respect to the second low-frequency-free signal when values of the second low-frequency-free signal are at least in the vicinity of 0; and second addition means for adding the second nonlinear process signal to the sub-scanning direction signal, to generate the second sharpening signal.

Consequently, it is possible to output a signal obtained by carrying out a nonlinear process on a moving image of a motion region in a main scanning direction and a sub scanning direction of the moving image of the motion region.

Accordingly, it is possible to steepen rising and falling of a signal corresponding to an edge portion included in a signal indicative of an image of a motion region. In particular, it is possible to further steepen rising and falling of a signal corresponding to the edge portion compared with a conventional sharpening process employing linear operation.

As a result, the signal processing device of the present invention can highly sharpen an image of a motion region, so that the signal processing device of the present invention can greatly reduce motion image blur in the motion region of a moving image, thereby improving image quality and giving feeling that resolution is increased.

Furthermore, the signal processing device of the present invention may be arranged so as to further include: third high-frequency component generation means for sharpening, before the second sharpening signal is outputted from the signal output means, a temporal direction signal that is a signal indicative of a pixel group consisting of pixels positioned adjacently in a temporal direction of a moving image represented by the second sharpening signal, the third high-frequency component generation means including: third low-frequency component removing means for removing, from frequency components of the temporal direction signal, at least a direct current component, to generate and output a third low-frequency-free signal; third nonlinear process means for generating a third nonlinear process signal (i) in which positive and negative signs of the third low-frequency-free signal are retained and (ii) which broadly monotonically increases nonlinearly with respect to the third low-frequency-free signal when values of the third low-frequency-free signal are at least in the vicinity of 0; and third addition means for adding the third nonlinear process signal to the temporal direction signal, to sharpen the temporal direction signal.

With the arrangement, it is possible to output a signal obtained by carrying out a nonlinear process on a moving image of a motion region in a temporal direction of the moving image.

As a result, the signal processing device of the present invention can further highly sharpen an image of the motion region.

The signal processing device of the present invention may be arranged so as to further include: fourth high-frequency component generation means for sharpening, before the non-motion region signal is outputted from the signal output means, the non-motion region signal, the fourth high-frequency component generation means including: fourth low-frequency component removing means for removing, from frequency components of the non-motion region signal, at least a direct current component, to generate and output a fourth low-frequency-free signal; fourth nonlinear process means for receiving the fourth low-frequency-free signal, generating a fourth nonlinear process signal (i) in which positive and negative signs of the fourth low-frequency-free signal are retained and (ii) which broadly monotonically increases nonlinearly with respect to the fourth low-frequency-free signal when values of the fourth low-frequency-free signal are at least in the vicinity of 0, and outputting the fourth nonlinear process signal; and fourth addition means for adding the fourth nonlinear process signal to the non-motion region signal, to sharpen the non-motion region signal.

With the arrangement, it is possible to output a signal obtained by carrying out a nonlinear process with respect to a non-motion region signal indicative of an image of a block region from which motion has not been detected (hereinafter still region) in a moving image.

When sharpening the non-motion region signal, the fourth nonlinear process signal obtained by a nonlinear process such as squaring the fourth low-frequency-free signal is added to the non-motion region signal. The generated signal retains positive and negative signs of the fourth low-frequency-free signal.

Consequently, the generated signal includes a high band frequency component which is not included in frequency components of a signal indicative of an image of a still region. As a result, the generated signal includes a frequency component higher than Nyquist frequency which is ½ of sampling frequency when the signal indicative of the image of the still region is made discrete.

Accordingly, it is possible to steepen rising and falling of a signal corresponding to an edge portion included in a signal indicative of an image of a still region. In particular, it is possible to further steepen rising and falling of a signal corresponding to the edge portion compared with a conventional sharpening process employing linear operation.

As a result, the signal processing device of the present invention can highly sharpen an image of a still region as well as a motion region, so that the signal processing device of the present invention can improve image quality and give feeling that resolution is increased.

Furthermore, the signal processing device of the present invention may be arranged such that at least one of the first nonlinear process means, the second nonlinear process means, the third nonlinear process means, and the fourth nonlinear process means includes: even exponentiation operation means for generating an even exponentiation signal by raising an incoming signal to an even exponent not less than 2; and sign changing means for reversing positive and negative signs of a part of the even exponentiation signal which part is different in sign from the incoming signal, and the even exponentiation signal including the signs having been reversed by the sign changing means is outputted.

With the arrangement, the even exponentiation signal is generated by raising the incoming signal to an even exponent not less than 2, and positive and negative signs of a part of the even exponentiation signal which part is different in sign from the frequency component before the exponentiation are reversed, and the signal including signs having been reversed is outputted.

Since the incoming signal is raised to an even exponent not less than 2 and the resulting signal is outputted while retaining positive and negative signs of the low-frequency-free signal before the exponentiation, a signal obtained by adding the output signal and the incoming signal has a high frequency component which is not included in the incoming signal.

Therefore, it is possible to further steepen rising and falling of a signal corresponding to an edge portion included in a signal to be sharpened, compared with a conventional method employing linear operation.

The signal processing device of the present invention may be arranged such that at least one of the first nonlinear process means, the second nonlinear process means, the third nonlinear process means, and the fourth nonlinear process means includes: even exponentiation operation means for generating an even exponentiation signal by raising an incoming signal to an even exponent not less than 2; differentiation means for generating a differential signal by differentiating the even exponentiation signal; and sign changing means for reversing positive and negative signs of a part of the differential signal which part is different in sign from the incoming signal, and the differential signal including the signs having been reversed by the sign changing means is outputted.

With the arrangement, the incoming signal is raised to an even exponent not less than 2 to generate an even exponentiation signal, and the even exponentiation signal is differentiated to generate a differential signal, and positive and negative signs of a part of the differential signal which part is different in sign from the incoming signal are reversed, and the differential signal including the signs having been reversed is outputted.

As described above, the incoming signal is raised to an even exponent not less than 2, and the resulting signal is differentiated to remove a direct current component that may be included in the signal, and the signal is outputted while retaining positive and negative signs of the incoming signal before the exponentiation. Accordingly, a signal obtained by adding the output signal and the incoming signal has a high frequency component which is not included in the incoming signal.

Therefore, it is possible to further steepen rising and falling of a signal corresponding to an edge portion included in a signal to be sharpened, compared with a conventional method using linear operation. Since the signal after the exponentiation is differentiated to remove a direct current component that may be included in the signal, it is possible to further steepen rising and falling of the signal, compared with a case where a direct current component that may be included in the signal after the exponentiation is not removed.

Furthermore, the signal processing device of the present invention may be arranged such that at least one of the first nonlinear process means, the second nonlinear process means, the third nonlinear process means, and the fourth nonlinear process means includes: odd exponentiation operation means for raising an incoming signal to an odd exponent not less than 3, and a resulting signal obtained by raising by the odd exponentiation operation means is outputted.

With the arrangement, the incoming signal is raised to an odd exponent not less than 3, and the resulting signal is outputted.

Since the incoming signal is raised to an odd exponent not less than 3 and the resulting signal is outputted, a signal obtained by adding the output signal and the incoming signal has a high frequency component which is not included in the incoming signal.

Therefore, it is possible to further steepen rising and falling of a signal corresponding to an edge portion included in a signal to be sharpened, compared with a conventional method employing linear operation.

Furthermore, the signal processing device of the present invention may be arranged such that at least one of the first nonlinear process means, the second nonlinear process means, the third nonlinear process means, and the fourth nonlinear process means includes: square root operation means for generating a square root signal by multiplying (i) a square root of an absolute value of a value calculated by dividing an incoming signal by a possible maximum value of the incoming signal, by (ii) the maximum value; and sign changing means for reversing positive and negative signs of a part of the square root signal which part is different in sign from the incoming signal, and the square root signal including the signs having been reversed by the sign changing means is outputted.

With the arrangement, a square root signal generated by multiplying (i) a square root of an absolute value of a value calculated by dividing the incoming signal by a possible maximum value of the incoming signal (i.e. normalized incoming signal) by (ii) the maximum value is outputted while retaining positive and negative signs of the incoming signal.

Therefore, a signal obtained by adding the output signal and the incoming signal includes a high frequency component which is not included in the incoming signal.

Therefore, it is possible to further steepen rising and falling of a signal corresponding to an edge portion included in a signal to be sharpened, compared with a conventional method employing linear operation.

The signal processing device of the present invention may be arranged such that at least one of the first nonlinear process means, the second nonlinear process means, the third nonlinear process means, and the fourth nonlinear process means, when values of an incoming signal are around 0, outputs a signal having an absolute value larger than that of the incoming signal.

With the arrangement, when values of the incoming signal are around 0, a signal having an absolute value larger than that of the incoming signal is outputted.

Consequently, in a zone where values of the incoming signal are around 0, the value of a signal to be added to a signal to be sharpened when generating an output signal can be larger than the value of the signal to be sharpened.

Therefore, in a zone where values of a low-frequency-free signal are around 0, it is possible to further steepen rising and falling of a signal corresponding to an edge portion included in a signal to be sharpened, compared with a conventional method employing linear operation.

Furthermore, the signal processing device of the present invention may be arranged such that at least one of the first low-frequency component removing means, the second low-frequency component removing means, the third low-frequency component removing means, and the fourth low-frequency component removing means is a high-pass filter having 3 or more taps.

With the arrangement, since the high-pass filter having 3 or more taps is used, it is possible to appropriately remove at least a direct current component from a signal to be sharpened.

Accordingly, a signal obtained by adding (i) a signal obtained by carrying out a nonlinear process with respect to a signal obtained by removing a direct current component from a signal to be sharpened and (ii) the signal to be sharpened has a high frequency component which is not included in the signal to be sharpened.

Therefore, it is possible to further steepen rising and falling of a signal corresponding to an edge portion included in a signal to be sharpened, compared with a conventional method employing linear operation.

The signal processing device of the present invention may be arranged such that at least one of the first low-frequency component removing means, the second low-frequency component removing means, the third low-frequency component removing means, and the fourth low-frequency component removing means further includes: low-level signal removing means for changing, out of signal values of an outgoing signal, signal values whose absolute values are lower than a predetermined lower limit to 0, and high-level signal removing means for changing, out of the signal values of the outgoing signal, signal values whose absolute values are higher than a predetermined upper limit in such a manner that the absolute values are not higher than the predetermined upper limit while maintaining signs of that signal values.

With the arrangement, out of the signal values of the outgoing signal, signal values whose absolute values are lower than a predetermined lower limit are changed to 0, and signal values whose absolute values are higher than a predetermined upper limit are changed in such a manner that the absolute values are not higher than the predetermined upper limit while maintaining signs of that signal values.

Consequently, it is possible to remove a noise included in the outgoing signal, and it is possible to prevent a high frequency component having large energy in the outgoing signal from being amplified by a nonlinear process.

Therefore, the outgoing signal does not include a noise, and it is possible to prevent the high frequency component having large energy from being amplified.

The signal processing device of the present invention may be arranged such that at least one of the first nonlinear process means, the second nonlinear process means, and the third nonlinear process means further includes: first amplitude adjustment means for adjusting an amplitude of the outgoing signal by multiplying the amplitude by a first predetermined magnification value.

With the arrangement, with respect to a motion region, the amplitude of the outgoing signal can be adjusted appropriately. Therefore, it is possible to prevent the amplitude of the outgoing signal from being too large.

Furthermore, the signal processing device of the present invention may be arranged such that the first amplitude adjustment means sets the first predetermined magnification value according to a size of motion having been detected by the motion detection means.

With the arrangement, it is possible to set the first predetermined magnification value according to a size of motion having been detected by the motion detection means. Therefore, it is possible to appropriately adjust the amplitude of the outgoing signal according to the size of detected motion.

Furthermore, the signal processing device of the present invention may be arranged such that the fourth nonlinear process means further includes: fourth amplitude adjustment means for adjusting an amplitude of the fourth nonlinear process signal by multiplying the amplitude by a second predetermined magnification value, and the first predetermined magnification value is larger than the second predetermined magnification value.

With the arrangement, it is possible to appropriately adjust the amplitude of the outgoing signal with respect to the still region, and it is possible to make the amplitude of the outgoing signal with respect to the still region smaller than the amplitude of the outgoing signal with respect to the motion region.

Therefore, sharpening of the still region can be subdued compared with sharpening of the motion region. In other words, the motion region can be sharpened to higher extent than the still region.

The signal processing device of the present invention may be arranged such that the motion detection means includes: difference calculation means for calculating a difference signal indicative of a difference between adjacent two frames; first high frequency component calculation means for calculating, with respect to said each block region, a first high frequency component included in one of the two frames; second high frequency component calculation means for calculating, with respect to said each block region, a second high frequency component included in the other of the two frames; third high frequency component calculation means for calculating, with respect to said each block region, a third high frequency component by adding a product of the first high frequency component and a first coefficient to a product of the second high frequency component and a second coefficient; and division means for calculating, with respect to said each block region, a motion signal by dividing the difference signal by the third high frequency component, motion being detected when the motion signal in said each block region is larger than a predetermined threshold.

With the arrangement, the third high frequency component is calculated by adding a product of the high frequency component (edge component) included in one of adjacent two frames and a first coefficient to a product of the high frequency component (edge component) included in the other of the two frames and a second coefficient. Then, the difference signal indicative of difference between the adjacent two frames is divided by the third high frequency component to calculate a motion signal. When the value of the motion signal is larger than the predetermined threshold in a certain block region, motion is detected in that block region.

Since the difference signal is divided by the third high frequency component calculated in consideration of high frequency components included in the adjacent two frames, respectively, it is possible to prevent division of the difference signal from generating a difference between a larger portion and a smaller portion of a signal value when a predetermined object moves at a constant speed in a screen.

Therefore, it is possible to detect a motion region more appropriately than a conventional art in which a difference signal is divided by a high frequency component included in one of adjacent two frames to calculate a motion signal.

The signal processing device of the present invention may be arranged such that in a case where an absolute value of the first high frequency component is equal to or larger than an absolute value of the second high frequency component, the third high frequency component calculation means sets the first coefficient to 1 and sets the second coefficient to 0, and in a case where the absolute value of the first high frequency component is smaller than the absolute value of the second high frequency component, the third high frequency component calculation means sets the first coefficient to 0 and sets the second coefficient to 1.

With the arrangement, out of the high frequency component (edge component) included in one of adjacent two frames and the high frequency component (edge component) included in the other of the adjacent two frames, the one with a larger absolute value can be the third high frequency component while maintaining its positive and negative signs.

Furthermore, the signal processing device of the present invention may be arranged such that the third high frequency component calculation means sets the first coefficient and the second coefficient to values ranging from 0 to 1 so that a sum of the first coefficient and the second coefficient is 1.

With the arrangement, the third high frequency component can be calculated by adding a multiple of the high frequency component included in one of adjacent two frames with $\{\gamma/(\gamma+\epsilon)\}$ to a multiple of the high frequency component included in the other of the adjacent two frames with $\{\epsilon/(\gamma+\epsilon)\}$. $\gamma$ and $\epsilon$ are any positive integers indicative of weight.

The signal processing device of the present invention may be arranged such that the third high frequency component calculation means sets the first coefficient and the second coefficient to 0.5.

With the arrangement, the third high frequency component can be calculated as an average of the high frequency component (edge component) included in one of adjacent two frames and the high frequency component (edge component) included in the other of the adjacent two frames.

The signal processing device of the present invention may be arranged such that the third high frequency component calculation means sets the first coefficient and the second coefficient to 1.

With the arrangement, the third high frequency component can be calculated as a sum of the high frequency component (edge component) included in one of adjacent two frames and the high frequency component (edge component) included in the other of the adjacent two frames.

The signal processing device may be realized by a computer. In this case, the present invention also encompasses a control program for the signal processing device which causes a computer to operate as the means of the signal processing device to realize the signal processing device by the computer, and a computer-readable storage medium in which the control program is stored.

Furthermore, a chip including the aforementioned integrated circuit is also encompassed in the present invention.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to devices for processing a digital signal indicative of an image. In particular, the present invention is preferably applicable to display devices etc. for displaying a moving image.

REFERENCE SIGNS LIST

11 High-frequency component extracting section (first low-frequency component removing means, second low-frequency component removing means, third low-frequency component removing means, fourth low-frequency component removing means, low-frequency component removing circuit)
15 Addition section (first addition means, second addition means, third addition means, fourth addition means, addition circuit)
21 Nonlinear operation section (even exponentiation operation means, square root operation means)
22 Nonlinear operation section (odd exponentiation operation means)
31 Differentiation section (differentiation means)
41 Sign changing section (sign changing means)
51 Limiter (first amplitude adjustment means, second amplitude adjustment means)
100, 100a-100e Sharpening process section (first high-frequency component generation means, second high-frequency component generation means, third high-frequency component generation means, fourth high-frequency component generation means, high-frequency component generation circuit)
102, 102a-102e Nonlinear process section (first nonlinear process means, second nonlinear process means, third nonlinear process means, fourth nonlinear process means, nonlinear process circuit)
132 Rounding process section (low-level signal removing means)
133 Limiter (high-level signal removing means)
200 Motion detection section (motion detection means, motion detection circuit)
220 Difference calculation section (difference calculation means)
230 First edge detection section (first high-frequency component calculation means)
240 Second edge detection section (second high-frequency component calculation means)
250 Edge calculation section (third high-frequency component calculation means)
260 Division section (division means)
300 Signal output section (signal output means, signal output circuit)
500, 500a-500d Signal processing device (integrated circuit)
S11 High-frequency signal (first low-frequency removal signal, second low-frequency removal signal, third low-frequency removal signal, fourth low-frequency removal signal, low-frequency removal signal)
S12 Nonlinear signal (even exponentiation signal, square root signal)
S22 Nonlinear signal
S31 Differential signal
S220 Difference signal
S230 First edge signal (first high-frequency component)
S240 Second edge signal (second high-frequency component)
S250 Edge signal (third high-frequency component)
S260 Motion signal
Sout Output signal (harmonic, first sharpening signal, second sharpening signal)
P1 First coefficient
P2 Second coefficient

The invention claimed is:

1. A signal processing device that subjects a signal indicative of a moving image constituted by a plurality of temporarily consecutive frames to a sharpening process for the moving image, to output a signal indicative of a moving image thus sharpened, each of the frames including a plurality of block regions, each of the plurality of block regions include one or a plurality of adjacent pixels, the signal processing device configured or programmed to include:

a motion detection section configured or programmed to detect motion between the frames with respect to each of the plurality of block regions;

a first high-frequency component generation section configured or programmed to generate a harmonic produced by sharpening a signal indicative of a moving image of a block region from which the motion has been detected by the motion detection section; and a signal output section configured or programmed to output, with respect to the block region from which the motion has been detected by the motion detection section, the harmonic having been produced by sharpening a motion region signal that is a signal indicative of a moving image of the block region from which the motion has been detected by the motion detection section, while outputting, with respect to the block region from which the motion has not been detected by the motion detection section, a non-motion region signal that is a signal indicative of a moving image of the block region from which the motion has been detected by the motion detection section, the first high-frequency component generation section including:
  a first low-frequency component removing section configured or programmed to remove, from frequency components of the motion region signal, at least a direct current component, to generate and output a first low-frequency-free signal;
  a first nonlinear process section configured or programmed to receive the first low-frequency-free signal, to generate a first nonlinear process signal (i) in which positive and negative signs of the first low-frequency-free signal are retained and (ii) which broadly monotonically increases nonlinearly with respect to the first low-frequency-free signal when values of the first low-frequency-free signal are at least in the vicinity of 0, and to output the first nonlinear process signal; and
  an addition section configured or programmed to add the first nonlinear process signal to the motion region signal, to generate the harmonic.

2. The signal processing device as set forth in claim 1, further comprising:
  a second high-frequency component generation section configured or programmed to sharpen, before the non-motion region signal is outputted from the signal output section, the non-motion region signal,
  the second high frequency component generation section including:
    a second low-frequency component removing section configured or programmed to remove, from frequency components of the non-motion region signal, at least a direct current component, to generate and output a second low-frequency-free signal;
    a second nonlinear process section configured or programmed to receive the second low-frequency-free signal, to generate a second nonlinear process signal (i) in which positive and negative signs of the second low-frequency-free signal are retained and (ii) which monotonically increases nonlinearly with respect to the second low-frequency-free signal when values of the second low-frequency-free signal are at least in the vicinity of 0, and to output the second nonlinear process signal; and
    a second addition section configured or programmed to add the second nonlinear process signal to the non-motion region signal, to sharpen the non-motion region signal.

3. The signal processing device as set forth in claim 2, wherein
  the first low-frequency component removing section further includes:
    a low-level signal removing section configured or programmed to change, out of signal values of an outgoing signal, signal values whose absolute values are lower than a predetermined lower limit to 0, and
    a high-level signal removing section configured or programmed to change, out of the signal values of the outgoing signal, signal values whose absolute values are higher than a predetermined upper limit in such a manner that the absolute values are not higher than the predetermined upper limit while maintaining signs of that signal values, the first nonlinear process section further includes:
    a first amplitude adjustment section configured or programmed to adjust an amplitude of the outgoing signal by multiplying the amplitude by a first predetermined magnification value, wherein the first amplitude adjustment section sets the first predetermined magnification value according to a size of motion having been detected by the motion detection section,
  the second nonlinear process section further includes:
    a second amplitude adjustment section configured or programmed to adjust an amplitude of the second nonlinear process signal by multiplying the amplitude by a second predetermined magnification value, and
    the first predetermined magnification value is larger than the second predetermined magnification value.

4. The signal processing device as set forth in claim 1, wherein
  the first nonlinear process section includes:
    an even exponentiation operation section configured or programmed to generate an even exponentiation signal by raising an incoming signal to an even exponent not less than 2; and
    a sign changing section configured or programmed to reverse positive and negative signs of a portion of the even exponentiation signal, the portion is different in sign from the incoming signal, and
    the even exponentiation signal including the signs having been reversed by the sign changing section is outputted.

5. The signal processing device as set forth in claim 1, wherein
  the first nonlinear process section includes:
    an even exponentiation operation section configured or programmed to generate an even exponentiation signal by raising an incoming signal to an even exponent not less than 2;
    a differentiation section configured or programmed to generate a differential signal by differentiating the even exponentiation signal; and
    a sign changing section configured or programmed to reverse positive and negative signs of a portion of the differential signal, the portion is different in sign from the incoming signal, and
    the differential signal including the signs having been reversed by the sign changing section is outputted.

6. The signal processing device as set forth in claim 1, wherein
  the first nonlinear process section includes:
    an odd exponentiation operation section configured or programmed to raise an incoming signal to an odd exponent not less than 3, and
    a resulting signal obtained by raising by the odd exponentiation operation section is outputted.

7. The signal processing device as set forth in claim 1, wherein
  the first nonlinear process section includes:
    a square root operation section configured or programmed to generate a square root signal by multiplying (i) a square root of an absolute value of a value calculated by dividing an incoming signal by a possible maximum value of the incoming signal, by (ii) the maximum value; and a sign changing section configured or programmed to reverse positive and negative signs of a portion of the square root signal, the portion is different in sign from the incoming signal, and the square root signal including the signs having been reversed by the sign changing section is outputted.

8. The signal processing device as set forth in claim 1, wherein
the first nonlinear process section, when values of an incoming signal are around 0, outputs a signal having an absolute value larger than that of the incoming signal.

9. The signal processing device as set forth in claim 1, wherein
the first low-frequency component removing section is a high-pass filter having 3 or more taps.

10. The signal processing device as set forth in claim 1, wherein
the first low-frequency component removing section further includes:
a low-level signal removing section configured or programmed to change, out of signal values of an outgoing signal, signal values whose absolute values are lower than a predetermined lower limit to 0, and
a high-level signal removing section configured or programmed to change, out of the signal values of the outgoing signal, signal values whose absolute values are higher than a predetermined upper limit in such a manner that the absolute values are not higher than the predetermined upper limit while maintaining signs of that signal values.

11. The signal processing device as set forth in claim 10, wherein
the first nonlinear process section further includes:
a first amplitude adjustment section configured or programmed to adjust an amplitude of the outgoing signal by multiplying the amplitude by a first predetermined magnification value.

12. The signal processing device as set forth in claim 11, wherein
the first amplitude adjustment section sets the first predetermined magnification value according to a size of motion having been detected by the motion detection section.

13. The signal processing device as set forth in claim 1, wherein
the motion detection section includes:
a difference calculation section configured or programmed to calculate a difference signal indicative of a difference between adjacent two frames;
a first high frequency component calculation section configured or programmed to calculate, with respect to said each block region, a first high frequency component included in one of the two frames;
a second high frequency component calculation section configured or programmed to calculate, with respect to said each block region, a second high frequency component included in the other of the two frames;
a third high frequency component calculation section configured or programmed to calculate, with respect to said each block region, a third high frequency component by adding a product of the first high frequency component and a first coefficient to a product of the second high frequency component and a second coefficient; and a division section configured or programmed to calculate, with respect to said each block region, a motion signal by dividing the difference signal by the third high frequency component, wherein
the motion detection section detects motion when the motion signal in said each block region is larger than a predetermined threshold.

14. A signal processing device that subjects a signal indicative of a moving image constituted by a plurality of temporarily consecutive frames to a sharpening process for the moving image, to output a signal indicative of a moving image thus sharpened, each of the frames including a plurality of block regions, each of the plurality of block regions include one or a plurality of adjacent pixels,
the signal processing device configured and programmed to include:
a motion detection section configured or programmed to detect motion between the frames with respect to each of the plurality of block regions;
a first high-frequency component generation section configured or programmed to generate a first sharpening signal by sharpening a signal indicative of a pixel group including pixels positioned adjacently in a main scanning direction of a moving image of a block region from which the motion has been detected by the motion detection section;
a second high-frequency component generation section configured or programmed to generate a second sharpening signal by sharpening a signal indicative of a pixel group including pixels positioned adjacently in a sub-scanning direction of the moving image represented by the first sharpening signal; and
a signal output section configured or programmed to output, with respect to the block region from which the motion has been detected by the motion detection section, the second sharpening signal having been produced by sharpening a motion region signal that is a signal indicative of a moving image of the block region from which the motion has been detected by the motion detection section, while outputting, with respect to the block region from which the motion has not been detected by the motion detection section, a non-motion region signal that is a signal indicative of a moving image of the block region from which the motion has been detected by the motion detection section,
the first high-frequency component generation section including:
a first low-frequency component removing section configured or programmed to remove, from frequency components of a main scanning direction signal that is a signal indicative of a pixel group including pixels positioned adjacently in a main scanning direction of a moving image of the block region from which the motion has been detected by the motion detection section, at least a direct current component, to generate and output a first low-frequency-free signal;
a first nonlinear process section configured or programmed to generate a first nonlinear process signal (i) in which positive and negative signs of the first low-frequency-free signal are retained and (ii) which broadly monotonically increases nonlinearly with respect to the first low-frequency-free signal when values of the first low-frequency-free signal are at least in the vicinity of 0; and a first addition section configured or programmed to add the first nonlinear process signal to the main scanning direction signal, to generate the first sharpening signal, the second high-frequency component generation section including:

a second low-frequency component removing section configured or programmed to remove, from frequency components of a sub-scanning direction signal that is a signal indicative of a pixel group including pixels positioned adjacently in a sub-scanning direction of a moving image represented by the first sharpening signal, at least a direct current component, to generate a second low-frequency-free signal;

a second nonlinear process section configured or programmed to generate and output a second nonlinear process signal (i) in which positive and negative signs of the second low-frequency-free signal are retained and (ii) which broadly monotonically increases nonlinearly with respect to the second low-frequency-free signal when values of the second low-frequency-free signal are at least in the vicinity of 0; and a second addition section configured or programmed to add the second nonlinear process signal to the sub-scanning direction signal, to generate the second sharpening signal.

15. The signal processing device as set forth in claim 14, further comprising:

a third high-frequency component generation section configured or programmed to sharpen, before the second sharpening signal is outputted from the signal output section, a temporal direction signal that is a signal indicative of a pixel group including pixels positioned adjacently in a temporal direction of a moving image represented by the second sharpening signal, the third high-frequency component generation section including:

a third low-frequency component removing section configured or programmed to remove, from frequency components of the temporal direction signal, at least a direct current component, to generate and output a third low-frequency-free signal;

a third nonlinear process section configured or programmed to generate a third nonlinear process signal (i) in which positive and negative signs of the third low-frequency-free signal are retained and (ii) which broadly monotonically increases nonlinearly with respect to the third low-frequency-free signal when values of the third low-frequency-free signal are at least in the vicinity of 0; and a third addition section configured or programmed to add the third nonlinear process signal to the temporal direction signal, to sharpen the temporal direction signal.

* * * * *